US012605967B2

(12) United States Patent
Bonaccorsi et al.

(10) Patent No.: US 12,605,967 B2
(45) Date of Patent: Apr. 21, 2026

(54) MOTORCYCLE TYRE

(71) Applicant: Pirelli Tyre S.p.A., Milan (IT)

(72) Inventors: Giuliano Bonaccorsi, Milan (IT); Matteo Torchiana, Milan (IT); Mario Mariani, Milan (IT); Federica Frezza, Milan (IT); Luca Napolitano, Milan (IT); Giuseppe Pezzullo, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 17 days.

(21) Appl. No.: 18/718,268

(22) PCT Filed: Dec. 16, 2022

(86) PCT No.: PCT/IB2022/062350
§ 371 (c)(1),
(2) Date: Jun. 10, 2024

(87) PCT Pub. No.: WO2023/111970
PCT Pub. Date: Jun. 22, 2023

(65) Prior Publication Data

US 2025/0050685 A1      Feb. 13, 2025

(30) Foreign Application Priority Data

Dec. 17, 2021    (IT) ........................ 102021000031685

(51) Int. Cl.
     *B60C 9/04*          (2006.01)
     *B60C 9/06*          (2006.01)
     *B60C 11/00*        (2006.01)
(52) U.S. Cl.
     CPC ........ *B60C 9/06* (2013.01); *B60C 2009/0433* (2013.01); *B60C 2009/0458* (2013.01); *B60C 2009/0475* (2013.01); *B60C 2200/10* (2013.01)

(58) Field of Classification Search
     CPC .... B60C 2009/0416; B60C 2009/0425; B60C 2009/0433; B60C 2009/0441;
            (Continued)

(56) References Cited

U.S. PATENT DOCUMENTS

2003/0159768 A1*   8/2003   Fritsch .................... B60C 9/005
                                                 57/238
2009/0173420 A1     7/2009   Katayama et al.
            (Continued)

FOREIGN PATENT DOCUMENTS

JP           07-108805 A      4/1995
JP       2008254476 A   *   10/2008
            (Continued)

OTHER PUBLICATIONS

Machine translation: JP-2008254476-A, Matsunami Toshiyuki, (Year: 2025).*

(Continued)

*Primary Examiner* — Kendra Ly
(74) *Attorney, Agent, or Firm* — Finnegan, Henderson, Farabow, Garrett & Dunner, L.L.P.

(57) ABSTRACT

A motorcycle tyre, comprising a radial carcass structure (2) and a tread band (8) applied at a radially outer position with respect to the radial carcass structure (2), wherein the radial carcass structure (2) comprises a first carcass ply (3a) and a second carcass ply (3b) including a first plurality of textile reinforcing cords (30) and a second plurality of textile reinforcing cords (32), respectively, wherein the first textile reinforcing cords (31) are parallel to each other and the second textile reinforcing cords (33) are parallel to each other and have a respective first and second inclination at a crown portion (8c) of the tread band (8) with respect to an equatorial plane (X-X) of the tyre, wherein said second inclination is opposite to said first inclination. The first (Continued)

textile reinforcing cords (31) and the second textile reinforcing cords (33) have a tenacity comprised between 0.35 cN/Tex and 1.2 cN/Tex at 2% elongation and comprised between 0.5 cN/Tex and 3 cN/Tex at 5% elongation. At least one central annular sector (8a) of the tread band (8) arranged astride of the equatorial plane (X-X) is made of a vulcanized elastomeric material having a static elastic modulus Ca3 measured at 70° C. comprised between 9.0 and 14.0, a tandelta measured at 70° C. and 10 Hz comprised between 0.120 and 0.160, and a dynamic elastic modulus F measured at 70° C. and 10 Hz comprised between 3.7 and 4.1.

16 Claims, 3 Drawing Sheets

(58) Field of Classification Search
CPC ...... B60C 2009/045; B60C 2009/0458; B60C 2009/0466; B60C 2009/0475; B60C 11/0041; B60C 11/005; B60C 11/0058; B60C 11/0066; B60C 11/0075; B60C 11/0008
See application file for complete search history.

(56) References Cited

U.S. PATENT DOCUMENTS

| | | | |
|---|---|---|---|
| 2010/0163144 A1 | 7/2010 | Nakagawa | |
| 2013/0167993 A1* | 7/2013 | Otani | B60C 11/00 |
| | | | 152/209.1 |
| 2022/0371373 A1* | 11/2022 | Ueda | B60C 9/10 |

FOREIGN PATENT DOCUMENTS

| | | | | |
|---|---|---|---|---|
| JP | 2009127152 A | * | 6/2009 | |
| WO | 2007055322 A1 | | 5/2007 | |
| WO | WO-2007052701 A1 | * | 5/2007 | B60C 9/2204 |

OTHER PUBLICATIONS

Machine translation: JP-2009127152-A, Fukumoto Toru, (Year: 2025).*

Machine translation: WO-2007052701-A1, Nakagawa Hidemitsu, (Year: 2025).*

International Search Report form the European Patent Office in corresponding International Application No. PCT/IB2022/062350 mailed Mar. 15, 2023.

Written Opinion of the International Searching Authority from the European Patent Office in corresponding International Application No. PCT/IB2022/062350 mailed Mar. 15, 2023.

* cited by examiner

MOTORCYCLE TYRE

This application is a national stage entry application under 35 U.S.C. § 371 of International Application No. PCT/IB2022/062350, filed on Dec. 16, 2022, and claims priority to Italian Application No. 102021000031685, filed Dec. 17, 2021; the contents of each application is incorporated herein by reference in its entirety.

The present invention relates to a motorcycle tyre.

The tyre of the invention is intended to be mounted on the front wheel and/or on the rear wheel of "big enduro" (or "big adventouring" or "dual purpose") motorcycles, which as known are motorcycles with large displacement, high power and high mass, designed to be driven both on tarmac roads and off-road. Such motorcycles generally have displacement equal to or greater than 1000 cm$^3$, power equal to or greater than 100 cv, maximum torque equal to or greater than 100 Nm and mass equal to or greater than 180 Kg.

Examples of "big enduro" motorcycles are BMW R 1250 GS, KTM 1290 Super Adventure R and Honda CRF1100L Africa Twin.

Motorcycles of this type have a very wide usage spectrum, which ranges from largely road use, comparable to sport touring also tending towards supersport, to off-road use more extreme than simple paved roads, like for example driving on all-terrain circuits, so-called dirt tracks, or tracks comprising riverbeds, soft ground, mud, sand and rough terrain of various kinds and difficulties.

In order to satisfy all these types of use, the market provides different tyre products each focused on a well-defined type of use, for example: sports road driving, road touring, road driving combined with dirt road, road driving combined with easy off-road, extreme off-road combined with road driving.

Typically, tyres for "big enduro" motorcycles intended primarily for road driving combined with dirt road are approved to reach maximum speeds of at least 210 km/h (ETRTO speed index: H). Such tyres generally have maximum width of radial section comprised between 90 and 170 (for example between 90 and 120 for the front tyres and between 130 and 170 for the rear tyres) and are mounted on wheel rims having fitting diameters typically comprised between about 17 inches and about 21 inches (for example between 19 and 21 inches for the front tyres and between 17 and 18 inches for the rear tyres).

The tyre of the present invention is of the type approved for road use and is intended for road driving combined with dirt road and typically provides for mainly road use in different load conditions (with rider only, with rider and luggage, with rider and one passenger, with rider one passenger and luggage) and in different weather conditions and for use, albeit minimal, on dirt roads.

PRIOR ART

"Big enduro" motorcycle tyres typically comprise a tread band having a tread pattern defined by a plurality of circumferential and transverse grooves at least partially separating tread blocks or portions of tread. Such tyres typically have a void/solid ratio comprised between about 0.1 and about 0.65.

SUMMARY OF THE INVENTION

In the present description and following claims, all the numerical magnitudes indicating quantities, parameters, percentages, and so on are to be considered preceded in every circumstance by the term "about" unless indicated otherwise. Moreover, all the ranges of numerical magnitudes include all the possible combinations of maximum and minimum numerical values and all the possible intermediate ranges, as well as those specifically indicated below.

Unless otherwise indicated, all ranges of numerical quantities also include maximum and minimum numerical values.

Hereinafter, the following definitions apply.

The term "phr" (an acronym for parts per hundred parts of rubber) indicates the parts by weight of a given elastomeric compound component per 100 parts by weight of the elastomeric polymer considered net of any plasticizing extension oils.

The term "elastomeric material", rubber", "elastomeric polymer" or "elastomer" is meant to indicate a material comprising a vulcanizable natural or synthetic polymer and a reinforcing filler, wherein such a material, at room temperature and after having been subjected to vulcanization, can undergo deformations caused by a force and is capable of quickly and energetically recovering the substantially original shape and size after the elimination of the deforming force (according to the definitions of standard ASTM D1566-11 Standard Terminology Relating To Rubber).

The term "diene polymer" is meant to indicate a polymer or copolymer deriving from the polymerization of one or more different monomers, at least one of which is a conjugated diene (conjugated diolefin).

The term "elastomeric compound" is meant to indicate the mixture obtainable by mixing and possible heating of at least one elastomeric polymer with at least one of the additives commonly used in the preparation of tyre compounds.

The term "vulcanizable elastomeric compound" is meant to indicate the elastomeric mixture ready for vulcanization that can be obtained by incorporation into an elastomeric compound of all additives including vulcanization additives.

The term "vulcanized elastomeric compound" is meant to indicate the material obtainable by vulcanization of a vulcanizable elastomeric compound.

The term "vulcanization" is meant to indicate the cross-linking reaction in a natural or synthetic rubber induced by a cross-linking agent, typically sulfur-based.

The term "vulcanizing agent" is meant to indicate a compound capable of transforming natural or synthetic rubber into an elastic and strong material thanks to the formation of a three-dimensional network of inter- and intra-molecular bonds. Typical vulcanizing agents are sulfur-based compounds such as elemental sulfur, polymeric sulfur, sulfur donor agents such as bis[(trialkoxysilyl)propyl]polysulfides, thiurams, dithiodimorpholines, and caprolactam-disulfide.

The term "vulcanization accelerant" is meant to indicate a compound capable of decreasing the duration of the vulcanization process and/or the operating temperature, like for example TBBS, sulfenamides in general, thiazoles, dithiophosphates, dithiocarbamates, guanidines, as well as sulfur donors such as thiurams.

The term "vulcanization activator" is meant to indicate a compound capable of further facilitating vulcanization by causing it to occur in a shorter time and possibly at lower temperature. An example of an activator is the stearic acid-zinc oxide system.

The term "vulcanization retardant" is meant to indicate a compound that is capable of delaying the start of the vulcanization reaction and/or suppressing unwanted secondary reactions, for example N-(cyclohexylthio)phthalimide (CTP) The term "vulcanization package" is meant to indicate the vulcanization agent and one or more vulcanization additives chosen from vulcanization activators, accelerants, and retardants.

The term "reinforcing filler" is meant to indicate a reinforcing material typically used in the industry to improve the mechanical properties of tyres, preferably selected from carbon black, conventional silica, such as silica from sand precipitated with strong acids, preferably amorphous, diatomaceous earth, calcium carbonate, titanium dioxide, talc, alumina, aluminosilicates, kaolin, silicate fibers, and mixtures thereof.

The term "white filler" is meant to indicate a conventional reinforcing material used in the industry selected from silica and conventional silicates, such as sepiolite, paligorskite also known as attapulgite, montmorillonite, halloysite, and the like, possibly modified by acid treatment and/or derivatized. Typically, white fillers have surface hydroxyl groups.

The expression "reinforcing cord", or more simply "cord" is meant to indicate an elongated element consisting of one or more elongated elements (also called "yarns") possibly coated with, or incorporated in, a matrix of elastomeric material.

Hereinafter, the expression "yarn" will be used to refer to an elongated element consisting of the aggregation of a plurality of textile filaments.

Each filament can also be called "fiber".

The term "linear density" or "count" of a cord or of a yarn or of a plurality of filaments is meant to indicate the weight of the cord or of the yarn or of the plurality of filaments per unit length. The linear density is measurable in dtex (grammes per 10 km of length).

The yarns can have one or more "ends", where the term "end" is meant to indicate a bundle of filaments twisted together. For example, there can be a single end or at least two ends twisted together.

The yarns can be identified with a symbol that represents the textile material, the count of the fiber used and the number of ends that form the yarn. For example, a yarn with ends made of NY (Nylon) identified as NY 1400×2 indicates a yarn comprising fibers made of NY with count 1400 dtex, formed from two ends twisted together.

The term "thread count" of a layer or of a ply or of a fabric is meant to indicate the number of reinforcing cords per unit length present in such a layer/ply/fabric. Thread count can be measured in cords per decimeter or TPI (threads per inch).

The terms "breaking load" and "elongation at break" of a reinforcing cord or of a yarn are meant to respectively indicate the load and the percentage elongation at which the reinforcing cord or the yarn breaks, evaluated in accordance with the BISFA standard relative to the material subjected to testing according to the definition given below.

The term "modulus" is meant to indicate the ratio between load (or force) and elongation measured at any point of a load-elongation curve according to the BISFA standard relative to the material subjected to testing according to the definition given below. Such a curve is drawn by calculating the first derivative of the load-elongation function that defines the aforementioned curve, normalized to the linear density expressed in Tex. The modulus is therefore expressed in cN/Tex or Mpa. In a load-elongation graph, the modulus is identified by the slope of the aforementioned curve with respect to the X-axis.

The term "tenacity" of a reinforcing cord or of a yarn is meant to indicate the ratio calculated between the modulus and the linear density. Tenacity is measured according to the BISFA standard relative to the material subjected to testing according to the definition given below. Tenacity can be expressed in cN/Tex or cN/dTex.

For the purposes of the present invention, for the measurement of the linear density and for determining the tensile properties, in particular the tenacity, reference is made to flat threads, without twists applied in the testing phase, according to the tests regulated by the BISFA (Bureau International pour Ia Standardisation des Fibres Artificielles) standard. In particular:

for Nylon (NY), reference is made to BISFA—Testing methods for polyamide yarns—2004 edition:

Determining linear density—Chapter 6—Procedure A;

Determining tensile properties—Chapter 7—Procedure A;

Preparation of laboratory samples: Preparation of samples under relaxation—paragraph 7.4.1.1=>preparation of samples on collapsible reel;

Preparation of laboratory samples and performance of testing: Manual test—paragraph 7.5.2.1=>c);

Start procedure=>e) pretension at the start of procedure;

Tractions carried out with Zwick—Roell Z010 dynamometer.

for cords or reinforcing wires of cellulose material, for example Rayon (Ry) or Lyocell (LY) reference should be made to BISFA—Test Methods for Viscose, Cupro, Acetate, Triacetate, and Lyocell Fiber Yarns—2007 Edition Determining tensile properties: Chapter 7—Tension test conditions: Oven dry test—Table 7.1—Test procedure—Section 7.5—with test on samples in oven relaxation—Subsection 7.5.2.4.

The term "motorcycle tyre" is meant to indicate a tyre having a high curvature ratio (typically greater than 0.20) and capable of reaching high camber angles during cornering.

The term "curvature ratio" is meant to indicate the ratio between the distance comprised between the radially highest point of the tread band and the maximum width of radial section of the tyre (such a distance also being identified as "arrow"), and the same maximum width of the tyre, in a cross section thereof.

The term "axial extension" of the tread band or portions thereof is meant to indicate the extension of the radially outermost profile of the tread band or portions thereof in a cross-section of the tyre carried out through a plane containing the axis of rotation of the tyre.

The term "equatorial plane" of the tyre is meant to indicate a plane perpendicular to the pivot axis of the tyre and that divides the tyre into two symmetrically equal parts.

The term "width" is meant to indicate a dimension measured along a direction perpendicular to the equatorial plane.

The term "annular sector" is meant to indicate a portion of the tread band extending circumferentially for the entire tread band and of predetermined axial extension.

The term "tread pattern" is meant to indicate the representation of all of the points of the tread band (grooves included) on a plane perpendicular to the equatorial plane of the tyre and tangent to the maximum diameter of the tyre. The tread pattern is defined by a plurality of blocks separated by grooves and possibly including recesses.

The term "void/solid ratio" is meant to indicate the ratio between the overall surface of the grooves of a certain annular portion of the tread pattern of the tyre (possibly of the entire tread band or tread pattern) and the surface of the certain portion of tread pattern (possibly of the entire tread band or tread pattern).

The term "footprint" of the tyre is meant to indicate the portion of tyre in contact with the ground or road surface when the tyre is mounted on a rim of a wheel and a predetermined vertical load is exerted on the tyre.

The terms "radial" and "axial" and the expressions "radially inner/outer" and "axially inner/outer" are used with reference, respectively, to a direction substantially parallel to the equatorial plane of the tyre and to a direction substantially perpendicular to the equatorial plane of the tyre, i.e. to a direction substantially perpendicular to the pivot axis of the tyre and to a direction substantially parallel to the pivot axis of the tyre, respectively.

The terms "circumferential" and "circumferentially" are used with reference to the direction of circumferential extension of the tyre, i.e. to the rolling direction of the tyre, which corresponds to a direction lying on a plane coinciding with or substantially parallel to the equatorial plane of the tyre.

The term "circumferential extension" of the tyre, or of the tread band or of portions thereof, is meant to indicate the extension in plan of the radially outermost surface of the tyre, or of the tread band or of portions thereof, on a plane tangent to the tyre.

The expressions "axially inner" and "axially outer" indicate a position respectively closer to, and further from, the equatorial plane with respect to a reference element.

The term "radial carcass structure" is meant to indicate a carcass structure comprising a plurality of reinforcing cords each of which is oriented, in a crown portion of the tyre, along a substantially axial direction. Such reinforcing cords can be incorporated in a single carcass ply or in plural carcass plies (preferably two) radially juxtaposed over one another.

The term "substantially axial direction" is meant to indicate a direction inclined, with respect to the equatorial plane of the tyre, by an angle comprised between 60° and 90°.

The term "substantially circumferential direction" is meant to indicate a direction oriented, with respect to the equatorial plane of the tyre, at an angle comprised between 0° and 20°.

The term "static mechanical properties" of a tread compound is meant to indicate the tensile stress-strain properties of vulcanized and thermoplastic rubbers according to the UNI 6065:2001 standard measured at a predetermined temperature on samples of the compound vulcanized at 170° C. for 10 minutes. For example, a static elastic modulus CA3 at 70° C. indicates the load at 300% elongation measured at 70° C.

The term "dynamic mechanical properties" of a tread compound is meant to indicate mechanical properties measured using an Instron Model 1341 dynamic device in the tension-compression mode as described here. A test piece of cross-linked material (170° C. for 15 minutes) was used, having a cylindrical shape (length=25 mm; diameter=18 mm), preloaded under compression up to a longitudinal deformation of 25% with respect to the initial length and kept at a predetermined temperature (for example 23° C., 70° C. and 100° C.) for the entire duration of the test. After a waiting time of 2 minutes followed by a mechanical pre-conditioning of 125 cycles at 10 Hz at 7.5% deformation amplitude with respect to the length under preload, the test piece was subjected to a dynamic sinusoidal stress having an amplitude of ±3.5% with respect to the length under preload, with a frequency of 10 Hz. Dynamic mechanical properties are expressed in terms of values of dynamic elastic modulus (E') and tandelta (loss factor). The tandelta value was calculated as the ratio between the viscous dynamic modulus (E'') and the elastic dynamic modulus (E').

The Applicant has observed that in order to cover their entire usage range in an optimal manner, "big enduro" motorcycles should be equipped with tyres suitable for allowing high performance both on the road (mainly stability at high speeds, roadholding in the dry and wet, handling) and off-road (mainly traction, controllability and directionality), together with the ability to travel many kilometers.

The Applicant has however found that with the current and increasingly common tendency to on the one hand obtain extreme road performance and on the other hand obtain extreme off-road performance, the aforementioned performance characteristics are at least partially in contrast with each other.

The Applicant has indeed noted that tyres that allow high performance on the road usually have severe off-road performance limitations and vice-versa.

The Applicant has also noted that tyres that balance road and off-road use with a good compromise solution do not allow satisfactory extreme performance to be obtained in one or other of the two environments (road and off-road).

The Applicant has observed that recently, in accordance with customers' requirements, the market has veered towards more specialist solutions, by foreseeing many segments of tyres for "big enduro" motorcycles, each of such segments being focused on a particular use of the motorcycle.

Accordingly, the Applicant has proposed tyres for "big enduro" motorcycles intended for predominantly road use, i.e. for road travel use combined with dirt road use that provide for main road use in different load conditions (with rider only, with rider and luggage, with rider and one passenger, with rider, one passenger and luggage) and in different weather conditions and for non-extreme use on dirt roads.

Tyres for mainly road use are made to maximize performance in terms of stability at high speeds in different load conditions, roadholding in the dry and in the wet, handling, mileage, traction and braking in the wet, on tarmac road surfaces.

The Applicant has focused its attention on the aforementioned segment of "big enduro" motorcycle tyres designed for predominantly on-road use, which are chosen by users who seek performance in road travel in a variety of load conditions and anticipate non-demanding use off-road.

The Applicant has thought to make a "big enduro" motorcycle tyre for predominantly road use that would improve performance in terms of high-speed stability under different load conditions (with rider only, with rider and luggage, with rider and one passenger, with rider, one passenger and luggage) on tarmac road surfaces.

Motorcycle tyres typically comprise a radial carcass structure extending between opposite bead structures, a belt structure arranged in a radially outer position with respect to the carcass structure, possibly consisting of or comprising a zero-degree reinforcing layer arranged in radially outer position with respect to the carcass structure, and a tread band arranged in radially outer position with respect to the belt structure.

The carcass structure is intended to give the tyre the desired characteristics of integrity and structural strength, whereas the belt structure, as well as contributing to obtaining the aforementioned characteristics of integrity and structural strength, is intended to transfer to the carcass structure the lateral and longitudinal stresses to which the tyre is subjected during travel after contact with the road surface. The zero degrees reinforcing layer, when present, is intended to limit the radial deformation of the belt structure.

Motorcycle steerability as perceived by the driver, thus the performance in terms of high-speed stability, dry and wet handling that is able to be achieved, depends on the grip of the motorcycle under all riding conditions and is therefore related to the footprint area. The stability of the footprint area, i.e. its ability to remain as constant as possible, is given by the stiffness of the tyre. Within certain limits, the stiffer the tyre, the less the tyre deforms, the faster the tyre recovers deformations during stresses.

Therefore, the Applicant has thought of increasing the stiffness of a tyre for "big enduro" motorcycles for predominantly road use to improve its performance in terms of high-speed stability under different load conditions.

To increase the stiffness of the tyre, the Applicant has thought of increasing the stiffness of the carcass structure.

A plurality of reinforcing cords are usually provided in the carcass structure to give the carcass structure structural strength and stiffness properties.

Typically, reinforcing cords made from low-modulus textile yarns are used to enhance ride comfort at the expense of performance in terms of stability, directionality and controllability.

On the other hand, reinforcing cords made from high-modulus textile yarns are used to enhance absolute performance in terms of ride stability, controllability, directionality, and road holding with sudden changes in direction and/or speed, at the expense of ride comfort.

The Applicant has found that, in fact, by making a carcass structure with high-modulus textile yarns the stiffness of the tyre for "big enduro" motorcycles is increased and performance in terms of high-speed stability under different trim conditions is improved.

However, the Applicant has noted that this improvement in stability at high speeds under different load conditions is accompanied by a deterioration in handling on both dry and wet surfaces.

In order to restore handling on dry and wet surfaces, the Applicant has thought of using so-called soft compounds, which better adapt to the roughness of the road surface by copying its irregular profile, to make the tread band. These compounds are typically characterized by low static mechanical properties and high hysteresis characteristics (related to dynamic mechanical properties under compression and in particular related to tandelta).

The Applicant has observed that using soft compounds for the tread band actually increases handling on both dry and wet surfaces.

However, the Applicant has noted that using soft compounds for the tread band decreases stability at high speeds in travel in a straight line, especially at high loads, i.e. when there is a passenger and/or luggage in addition to the rider.

The Applicant has surprisingly found that by arranging a radial carcass structure comprising two juxtaposed carcass plies equipped with reinforcing cords made from low-modulus textile yarns and arranging a tread band in which at least one annular sector arranged astride of the equatorial plane is made with a compound having high static mechanical properties and low hysteresis, it is possible to make a tyre for "big enduro" motorcycles for predominantly road use having improved performance in terms of high-speed stability under various load conditions without worsening and indeed surprisingly improving performance in terms of dry and wet handling.

The improvement in the high-speed stability and dry and wet handling performance of the tyre is surprising since a radial carcass structure equipped with reinforcing cords made from low-modulus textile yarns and a tread band having at least one annular sector arranged astride of the equatorial plane made from a compound with high static mechanical properties and low hysteresis seemed ill-suited to provide high-speed stability under different load conditions and dry and wet handling at the same time.

The present invention relates to a motorcycle tyre comprising a radial carcass structure and a tread band applied in radially outer position with respect to the radial carcass structure.

Preferably, said radial carcass structure comprises a first carcass ply including a first plurality of textile reinforcing cords.

Preferably, said carcass structure comprises a second carcass ply including a second plurality of said textile reinforcing cords.

Preferably, the textile reinforcing cords of the first plurality of textile reinforcing cords are substantially parallel to each other and have a first inclination at the crown portion of the tread band, of a predetermined angle of inclination, with respect to the equatorial plane of the tyre.

Preferably, the textile reinforcing cords of the second plurality of textile reinforcing cords are substantially parallel to each other and have a second inclination at the crown portion of the tread band, of said predetermined angle of inclination, with respect to the equatorial plane of the tyre.

Preferably, said second inclination is opposite to said first inclination.

Preferably, said second carcass ply is radially juxtaposed over the first carcass ply.

Preferably, said textile reinforcing cords of the first plurality of textile reinforcing cords and of the second plurality of textile reinforcing cords have a tenacity greater than 0.35 cN/Tex at 2% elongation.

Preferably, said textile reinforcing cords of the first plurality of textile reinforcing cords and of the second plurality of textile reinforcing cords have a tenacity of less than 1.2 cN/Tex at 2% elongation.

Preferably, said textile reinforcing cords of the first plurality of textile reinforcing cords and of the second plurality of textile reinforcing cords have a tenacity greater than 0.5 cN/Tex at 5% elongation.

Preferably, said textile reinforcing cords of the first plurality of textile reinforcing cords and of the second plurality of textile reinforcing cords have a tenacity of less than 3.0 cN/Tex at 5% elongation.

Preferably, at least one central annular sector of said tread band arranged astride of the equatorial plane is made of a vulcanized elastomeric material having a static elastic modulus Ca3 measured at 70° C. greater than 9.0.

Preferably, at least one central annular sector of said tread band arranged astride of the equatorial plane is made of a vulcanized elastomeric material having a static elastic modulus Ca3 measured at 70° C. less than 14.0.

More preferably, said central annular sector is made of a vulcanized elastomeric material having a static elastic modulus Ca3 measured at 70° C. greater than 10.0.

More preferably, said central annular sector is made of a vulcanized elastomeric material having a static elastic modulus Ca3 measured at 70° C. less than 13.0.

Preferably, said central annular sector is made of a vulcanized elastomeric material having a tandelta measured at 70° C. and 10 Hz greater than 0.120.

Preferably, said central annular sector is made of a vulcanized elastomeric material having a tandelta measured at 70° C. and 10 Hz less than 0.160.

More preferably, said central annular sector is made of a vulcanized elastomeric material having a tandelta measured at 70° C. and 10 Hz greater than 0.135.

More preferably, said central annular sector is made of a vulcanized elastomeric material having a tandelta measured at 70° C. and 10 Hz less than 0.155.

Preferably, said central annular sector is made of a vulcanized elastomeric material having an elastic dynamic modulus E' measured at 70° C. and 10 Hz greater than 3.7.

Preferably, said central annular sector is made of a vulcanized elastomeric material having an elastic dynamic modulus E' measured at 70° C. and 10 Hz less than 4.1.

The Applicant has experimentally found that by using a cross-ply carcass structure and a tread band having the aforementioned characteristics, it is surprisingly possible to improve the high-speed stability performance under different load conditions without worsening and indeed improving the dry and wet handling performance of a "big enduro" type motorcycle tyre for predominantly on-road use and involving non-demanding off-road use.

Without being constrained to any interpretative theory, the Applicant deems that the unexpected improvement in high-speed stability and dry and wet handling is at least partly attributable to the fact that the stiffness of the tyre, and thus the improved high-speed stability under different load conditions, is obtained by making the radial carcass structure with two radially juxtaposed plies and by controlling within the aforementioned values the static elastic modulus Ca3 at 70° C. of the central annular sector of the tread band arranged astride of the equatorial plane, and to the fact that dry and wet handling is obtained, in such a structure, by controlling within the aforementioned values the tenacity of the textile reinforcing cords of the carcass plies and controlling within the aforementioned values the tandelta at 70° C. and the dynamic elastic modulus E' at 70° C.

Surprisingly, this advantageous technical effect was also observed by using relatively "low" tenacity textile reinforcing cords in the carcass plies, which are notoriously not used to make a tyre stiffer, and relatively "low" tandelta values at 70° C. (thus with limited hysteresis), which are notoriously not advantageous for improving dry and wet handling.

The present invention can present at least one of the preferred characteristics described hereinafter.

Preferably, said textile reinforcing cords of the first plurality of textile reinforcing cords and of the second plurality of textile reinforcing cords have a tenacity greater than 0.4 at 2% elongation.

Preferably, said textile reinforcing cords of the first plurality of textile reinforcing cords and of the second plurality of textile reinforcing cords have a tenacity greater than 0.45 cN/Tex at 2% elongation.

Preferably, said textile reinforcing cords of the first plurality of textile reinforcing cords and of the second plurality of textile reinforcing cords have a tenacity greater than 0.5 cN/Tex at 2% elongation.

Preferably, said textile reinforcing cords of the first plurality of textile reinforcing cords and of the second plurality of textile reinforcing cords have a tenacity greater than 0.55 cN/Tex at 2% elongation.

Preferably, said textile reinforcing cords of the first plurality of textile reinforcing cords and of the second plurality of textile reinforcing cords have a tenacity of less than 1.0 cN/Tex at 2% elongation.

Preferably, said textile reinforcing cords of the first plurality of textile reinforcing cords and of the second plurality of textile reinforcing cords have a tenacity of less than 0.85 cN/Tex at 2% elongation.

Preferably, said textile reinforcing cords of the first plurality of textile reinforcing cords and of the second plurality of textile reinforcing cords have a tenacity of less than 0.7 cN/Tex at 2% elongation.

Preferably, said textile reinforcing cords of the first plurality of textile reinforcing cords and of the second plurality of textile reinforcing cords have a tenacity of less than 0.6 cN/Tex at 2% elongation.

Preferably, said textile reinforcement cords of the first plurality of textile reinforcing cords and the second plurality of textile reinforcing cords have a tenacity of less than 0,57 cN/Tex at 2% elongation.

Preferably, said textile reinforcing cords of the first plurality of textile reinforcing cords and of the second plurality of textile reinforcing cords have a tenacity greater than 0.6 cN/Tex at 5% elongation.

Preferably, said textile reinforcing cords of the first plurality of textile reinforcing cords and of the second plurality of textile reinforcing cords have a tenacity greater than 0.7 cN/Tex at 5% elongation.

Preferably, said textile reinforcing cords of the first plurality of textile reinforcing cords and of the second plurality of textile reinforcing cords have a tenacity greater than 0.8 cN/Tex at 5% elongation.

Preferably, said textile reinforcing cords of the first plurality of textile reinforcing cords and of the second plurality of textile reinforcing cords have a tenacity greater than 0.85 cN/Tex at 5% elongation.

Preferably, said textile reinforcing cords of the first plurality of textile reinforcing cords and of the second plurality of textile reinforcing cords have a tenacity greater than 0.9 cN/Tex at 5% elongation.

Preferably, said textile reinforcing cords of the first plurality of textile reinforcing cords and of the second plurality of textile reinforcing cords have a tenacity greater than 0.95 cN/Tex at 5% elongation.

Preferably, said textile reinforcing cords of the first plurality of textile reinforcing cords and of the second plurality of textile reinforcing cords have a tenacity of less than 2.5 cN/Tex at 5% elongation.

Preferably, said textile reinforcing cords of the first plurality of textile reinforcing cords and of the second plurality of textile reinforcing cords have a tenacity of less than 2 cN/Tex at 5% elongation.

Preferably, said textile reinforcing cords of the first plurality of textile reinforcing cords and of the second plurality of textile reinforcing cords have a tenacity of less than 1,5 cN/Tex at 5% elongation.

Preferably, said textile reinforcing cords of the first plurality of textile reinforcing cords and of the second plurality of textile reinforcing cords have a tenacity of less than 1,2 cN/Tex at 5% elongation.

Preferably, said textile reinforcing cords of the first plurality of textile reinforcing cords and of the second plurality of textile reinforcing cords have a tenacity of less than 1,1 cN/Tex at 5% elongation.

Preferably, said textile reinforcement cords of the first plurality of textile reinforcing cords and the second plurality of textile reinforcing cords have a tenacity of less than 1 cN/Tex at 5% elongation.

Preferably, said central annular sector of the tread band is made of a vulcanized elastomeric material having a static elastic modulus Ca3 measured at 70° C. greater than 10.8.

Preferably, said central annular sector of the tread band is made of a vulcanized elastomeric material having a static elastic modulus Ca3 measured at 70° C. greater than 11.

Preferably, said central annular sector of the tread band is made of a vulcanized elastomeric material having a static elastic modulus Ca3 measured at 70° C. greater than 11.3.

Preferably, said central annular sector of the tread band is made of a vulcanized elastomeric material having a static elastic modulus Ca3 measured at 70° C. of less than 12.5.

Preferably, said central annular sector of the tread band is made of a vulcanized elastomeric material having a static elastic modulus Ca3 measured at 70° C. of less than 12.

Preferably, said central annular sector of the tread band is made of a vulcanized elastomeric material having a static elastic modulus Ca3 measured at 70° C. of less than 11.8.

Preferably, said central annular sector of the tread band is made of a vulcanized elastomeric material having a static elastic modulus Ca3 measured at 70° C. of less than 11.7.

Preferably, said central annular sector of the tread band is made of a vulcanized elastomeric material having a static elastic modulus Ca3 measured at 70° C. of 11.5.

Preferably, said central annular sector is made of a vulcanized elastomeric material having a tandelta measured at 70° C. and 10 Hz greater than 0.140.

Preferably, said central annular sector is made of a vulcanized elastomeric material having a tandelta measured at 70° C. and 10 Hz greater than 0.142.

Preferably, said central annular sector is made of a vulcanized elastomeric material having a tandelta measured at 70° C. and 10 Hz less than 0.150.

Preferably, said central annular sector is made of a vulcanized elastomeric material having a tandelta measured at 70° C. and 10 Hz less than 0.148.

Preferably, said central annular sector is made of a vulcanized elastomeric material having a tandelta measured at 70° C. and 10 Hz of 0.145.

Preferably, said central annular sector is made of a vulcanized elastomeric material having an elastic dynamic modulus E' measured at 70° C. and 10 Hz greater than 3.8.

Preferably, said central annular sector is made of a vulcanized elastomeric material having an elastic dynamic modulus E' measured at 70° C. and 10 Hz less than 4.

Preferably, said central annular sector is made of a vulcanized elastomeric material having an elastic dynamic modulus E' measured at 70° C. and 10 Hz of 3.9.

Preferably, said central annular sector of said tread band is made of a vulcanized elastomeric material having a ratio between tandelta measured at 70° C. and 10 Hz and dynamic elastic modulus E' measured at 70° C. and 10 Hz greater than 0.03.

Preferably, said central annular sector of said tread band is made of a vulcanized elastomeric material having a ratio between tandelta measured at 70° C. and 10 Hz and dynamic elastic modulus E' measured at 70° C. and 10 Hz greater than 0.035.

Preferably, said central annular sector of said tread band is made of a vulcanized elastomeric material having a ratio between tandelta measured at 70° C. and 10 Hz and dynamic elastic modulus E' measured at 70° C. and 10 Hz less than 0.04.

Preferably, said central annular sector of said tread band is made of a vulcanized elastomeric material having a ratio between tandelta measured at 70° C. and 10 Hz and dynamic elastic modulus E' measured at 70° C. and 10 Hz less than 0.038.

Preferably, said central annular sector of said tread band is made of vulcanized elastomeric material having a ratio between tandelta measured at 70° C. and 10 Hz and dynamic elastic modulus E' measured at 70° C. and 10 Hz of 0.037.

Preferably, the tread band comprises two lateral annular sectors arranged on opposite sides with respect to the equatorial plane of the tyre and arranged adjacent to said central annular sector.

Preferably, the central annular sector is made of an elastomeric material different from the elastomeric material from which said two lateral annular sectors are made.

Preferably, the central annular sector is made of a vulcanized elastomeric material having tandelta measured at 70° C. and 10 Hz less than a tandelta measured at 70° C. and 10 Hz of the vulcanized elastomeric material of said two lateral annular sectors.

This provision makes it possible to have a compound with higher hysteresis in the shoulder, i.e. in the two lateral annular sectors, with respect to the compound in the crown, i.e. with respect to the central annular sector, allowing the tyre to better adapt to the roughness of the road surface by copying its irregular profile during cornering.

The Applicant has observed that higher hysteresis in the two lateral annular sectors with respect to the central sector does not affect high-speed stability under different load conditions.

Preferably, the central annular sector is made of a vulcanized elastomeric material having tandelta measured at 70° C. and 10 Hz greater than a threshold value, wherein said threshold value is equal to 75% of the tandelta of the vulcanized elastomeric material of the lateral annular sectors measured at 70° C. and 10 Hz.

Preferably, the central annular sector is made of a vulcanized elastomeric material having tandelta measured at 70° C. and 10 Hz greater than a threshold value, wherein said threshold value is equal to 80% of the tandelta of the vulcanized elastomeric material of the lateral annular sectors measured at 70° C. and 10 Hz.

Preferably, the central annular sector is made of a vulcanized elastomeric material having tandelta measured at 70° C. and 10 Hz greater than a threshold value, wherein said threshold value is equal to 85% of the tandelta of the vulcanized elastomeric material of the lateral annular sectors measured at 70° C. and 10 Hz.

Preferably, the central annular sector is made of a vulcanized elastomeric material having tandelta measured at 70° C. and 10 Hz greater than a threshold value, wherein said threshold value is equal to 90% of the tandelta of the vulcanized elastomeric material of the lateral annular sectors measured at 70° C. and 10 Hz.

Preferably, the central annular sector is made of a vulcanized elastomeric material having tandelta measured at 70° C. and 10 Hz less than a threshold value, wherein said threshold value is equal to 98% of the tandelta of the vulcanized elastomeric material of the lateral annular sectors measured at 70° C. and 10 Hz.

Preferably, the central annular sector is made of a vulcanized elastomeric material having tandelta measured at 70° C. and 10 Hz less than a threshold value, wherein said threshold value is equal to 95% of the tandelta of the vulcanized elastomeric material of the lateral annular sectors measured at 70° C. and 10 Hz.

Preferably, the central annular sector is made of a vulcanized elastomeric material having tandelta measured at 70° C. and 10 Hz equal to 92% of the tandelta of the vulcanized elastomeric material of the lateral annular sectors measured at 70° C. and 10 Hz.

Preferably, the central annular sector is made of a vulcanized elastomeric material having an elastic dynamic modulus E' measured at 70° C. and 10 Hz greater than the elastic dynamic modulus E' measured at 70° C. and 10 Hz of the vulcanized elastomeric material of said two lateral annular sectors.

Preferably, the central annular sector is made of a vulcanized elastomeric material having elastic dynamic modulus E' measured at 70° C. and 10 Hz less than a threshold value, wherein said threshold value is equal to 115% of the elastic dynamic modulus E' measured at 70° C. and 10 Hz of the vulcanized elastomeric material of said two lateral annular sectors.

Preferably, the central annular sector is made of a vulcanized elastomeric material having elastic dynamic modulus E' measured at 70° C. and 10 Hz less than a threshold value, wherein said threshold value is equal to 112% of the elastic dynamic modulus E' measured at 70° C. and 10 Hz of the vulcanized elastomeric material of said two lateral annular sectors.

Preferably, the central annular sector is made of a vulcanized elastomeric material having elastic dynamic modulus E' measured at 70° C. and 10 Hz less than a threshold value, wherein said threshold value is equal to 109% of the elastic dynamic modulus E' measured at 70° C. and 10 Hz of the vulcanized elastomeric material of said two lateral annular sectors.

Preferably, the central annular sector is made of a vulcanized elastomeric material having elastic dynamic modulus E' measured at 70° C. and 10 Hz greater than a threshold value, wherein said threshold value is equal to 101% of the elastic dynamic modulus E' measured at 70° C. and 10 Hz of the vulcanized elastomeric material of said two lateral annular sectors.

Preferably, the central annular sector is made of a vulcanized elastomeric material having elastic dynamic modulus E' measured at 70° C. and 10 Hz greater than a threshold value, wherein said threshold value is equal to 103% of the elastic dynamic modulus E' measured at 70° C. and 10 Hz of the vulcanized elastomeric material of said two lateral annular sectors.

Preferably, the central annular sector is made of a vulcanized elastomeric material having an elastic dynamic modulus E' measured at 70° C. and 10 Hz equal to 106% of the elastic dynamic modulus E' measured at 70° C. and 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz less than said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz greater than a threshold value, wherein said threshold value is equal to 75% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz greater than a threshold value, wherein said threshold value is equal to 80% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz greater than a threshold value, wherein said threshold value is equal to 85% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz less than a threshold value, wherein said threshold value is equal to 98% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz less than a threshold value, wherein said threshold value is equal to 95% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz less than a threshold value, wherein said threshold value is equal to 90% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having ratio between tandelta measured at 70° C. and at 10 Hz and dynamic elastic modulus E' measured at 70° C. and at 10 Hz equal to 87% of said ratio between tandelta measured at 70° C. and at 10 Hz and dynamic elastic modulus E' measured at 70° C. and at 10 Hz of the vulcanized elastomeric material of said two lateral annular sectors.

Preferably, the central annular sector is made of a vulcanized elastomeric material having a static elastic modulus Ca3 measured at 70° C. greater than said static elastic modulus Ca3 measured at 70° C. of the vulcanized elastomeric material of said two lateral annular sectors.

This provision makes it possible to have a compound with lower static mechanical performance in the lateral annular sectors with respect to the compound in the central annular sector, contributing to enabling the tyre to better adapt to the roughness of the road surface by copying its irregular profile during cornering.

The Applicant has observed that while the static moduli, and in particular the Ca3 measured at 70° C., in the lateral annular sectors are not equal to the value of the static moduli of the central annular sector, the increase in the static modulus of the compound in the central annular sector alone allows high-speed stability to be obtained under different load conditions.

Preferably, the central annular sector is made of a vulcanized elastomeric material having static elastic modulus Ca3 measured at 70° C. less than a threshold value, wherein said threshold value is equal to 150% of said static elastic modulus Ca3 measured at 70° C. of the vulcanized elastomeric material of said two lateral annular sectors.

Preferably, the central annular sector is made of a vulcanized elastomeric material having static elastic modulus Ca3 measured at 70° C. less than a threshold value, wherein said threshold value is equal to 140% of said static elastic modulus Ca3 measured at 70° C. of the vulcanized elastomeric material of said two lateral annular sectors.

Preferably, the central annular sector is made of a vulcanized elastomeric material having static elastic modulus Ca3 measured at 70° C. less than a threshold value, wherein said threshold value is equal to 135% of said static elastic modulus Ca3 measured at 70° C. of the vulcanized elastomeric material of said two lateral annular sectors.

Preferably, the central annular sector is made of a vulcanized elastomeric material having static elastic modulus Ca3 measured at 70° C. greater than a threshold value, wherein said threshold value is equal to 101% of said static elastic modulus Ca3 measured at 70° C. of the vulcanized elastomeric material of said two lateral annular sectors.

Preferably, the central annular sector is made of a vulcanized elastomeric material having static elastic modulus Ca3 measured at 70° C. greater than a threshold value, wherein said threshold value is equal to 110% of said static elastic modulus Ca3 measured at 70° C. of the vulcanized elastomeric material of said two lateral annular sectors.

Preferably, the central annular sector is made of a vulcanized elastomeric material having a static elastic modulus Ca3 measured at 70° C. greater than a threshold value, wherein said threshold value is equal to 120% of said static elastic modulus Ca3 measured at 70° C. of the vulcanized elastomeric material of said two lateral annular sectors.

Preferably, the central annular sector is made of a vulcanized elastomeric material having a static elastic modulus Ca3 measured at 70° C. greater than a threshold value, wherein said threshold value is equal to 125% of said static elastic modulus Ca3 measured at 70° C. of the vulcanized elastomeric material of said two lateral annular sectors.

Preferably, the central annular sector is made of a vulcanized elastomeric material having static elastic modulus Ca3 measured at 70° C. equal to 130% of said static elastic modulus Ca3 measured at 70° C. of the vulcanized elastomeric material of said two lateral annular sectors.

Preferably, said central annular sector has an axial extension of width greater than 15% of the width of the tread band.

Preferably, said central annular sector has an axial extension of width greater than 18% of the width of the tread band.

Preferably, said central annular sector has an axial extension of width less than 30% of the width of the tread band.

Preferably, said central annular sector has an axial extension of width less than 28% of the width of the tread band.

Preferably, said central annular sector has an axial extension of width equal to 22% of the width of the tread band.

Preferably, said two lateral annular sectors have respective axial extensions of equal width.

Preferably, the sum of the widths of the axial extensions of the two lateral annular sectors and the axial extension of the central annular sector coincides with the width of the axial extension of the tread band.

Preferably, the tread band has a void/solid ratio comprised between 0.4 and 0.65.

Preferably, the tread band has a symmetrical tread pattern with respect to the equatorial plane of the tyre.

Preferably, said textile reinforcing cords of the first plurality of textile reinforcing cords and of the second plurality of textile reinforcing cords are made of the same material.

Preferably, said textile reinforcing cords of the first plurality of textile reinforcing cords and of the second plurality of textile reinforcing cords are made of fibers selected from the group comprising aliphatic polyamide fibers (e.g. Nylon 6, Nylon 6.6, Nylon 4.6, Nylon 4.10, Nylon 10.10, Nylon 11, Nylon 12, Nylon 6.10, Nylon 6.12), polyester fibers (e.g. polyethylene terephthalate), Rayon fibers.

Preferably, said textile reinforcing cords of the first plurality of textile reinforcing cords and of the second plurality of textile reinforcing cords are made of Nylon.

Preferably, said textile reinforcing cords of the first plurality of textile reinforcing cords and of the second plurality of textile reinforcing cords are made of Nylon 6.6.

Preferably, said textile reinforcing cords of the first plurality of textile reinforcing cords and of the second plurality of textile reinforcing cords have equal linear density.

Preferably, said textile reinforcing cords of the first plurality of textile reinforcing cords and of the second plurality of textile reinforcing cords have linear density greater than 2000.

Preferably, said textile reinforcing cords of the first plurality of textile reinforcing cords and of the second plurality of textile reinforcing cords have linear density greater than 2200.

Preferably, said textile reinforcing cords of the first plurality of textile reinforcing cords and of the second plurality of textile reinforcing cords have linear density greater than 2400.

Preferably, said textile reinforcing cords of the first plurality of textile reinforcing cords and of the second plurality of textile reinforcing cords have linear density greater than 2600.

Preferably, said textile reinforcing cords of the first plurality of textile reinforcing cords and of the second plurality of textile reinforcing cords have linear density of less than 4600.

Preferably, said textile reinforcing cords of the first plurality of textile reinforcing cords and of the second plurality of textile reinforcing cords have linear density of less than 4200.

Preferably, said textile reinforcing cords of the first plurality of textile reinforcing cords and of the second plurality of textile reinforcing cords have linear density of less than 3800.

Preferably, said textile reinforcing cords of the first plurality of textile reinforcing cords and of the second plurality of textile reinforcing cords have linear density of less than 3200.

Preferably, said textile reinforcing cords of the first plurality of textile reinforcing cords and of the second plurality of textile reinforcing cords have linear density of less than 3000.

Preferably, said textile reinforcing cords of the first plurality of textile reinforcing cords and of the second plurality of textile reinforcing cords have linear density of 2800 dTex.

Preferably, said textile reinforcing cords of the first plurality of textile reinforcing cords and of the second plurality of textile reinforcing cords have linear density greater than 1100×2 dTex where the term x2 represents the number of ends of yarn twisted together in each reinforcing cord.

Preferably, said textile reinforcing cords of the first plurality of textile reinforcing cords and of the second plurality of textile reinforcing cords have linear density greater than 1200×2 dTex where the term x2 represents the number of ends of yarn twisted together in each reinforcing cord.

Preferably, said textile reinforcing cords of the first plurality of textile reinforcing cords and of the second plurality of textile reinforcing cords have linear density of less than 1840×2 dTex where the term x2 represents the number of ends of yarn twisted together in each reinforcing cord.

Preferably, said textile reinforcing cords of the first plurality of textile reinforcing cords and of the second plurality of textile reinforcing cords have linear density of less than 1600×2 dTex where the term x2 represents the number of ends of yarn twisted together in each reinforcing cord.

Preferably, said textile reinforcing cords of the first plurality of textile reinforcing cords and of the second plurality of textile reinforcing cords have linear density of less than 1400×2 dTex where the term x2 represents the number of ends of yarn twisted together in each reinforcing cord.

Preferably, said textile reinforcing cords of the first plurality of textile reinforcing cords and of the second plurality of textile reinforcing cords have equal thread count.

Preferably, said textile reinforcing cords of the first plurality of textile reinforcing cords and of the second plurality of textile reinforcing cords have thread count greater than 80 cords/dm.

Preferably, said textile reinforcing cords of the first plurality of textile reinforcing cords and of the second plurality of textile reinforcing cords have thread count greater than 90 cords/dm.

Preferably, said textile reinforcing cords of the first plurality of textile reinforcing cords and of the second plurality of textile reinforcing cords have thread count greater than 100 cords/dm.

Preferably, said textile reinforcing cords of the first plurality of textile reinforcing cords and of the second plurality of textile reinforcing cords have thread count of less than 130 cords/dm.

Preferably, said textile reinforcing cords of the first plurality of textile reinforcing cords and of the second plurality of textile reinforcing cords have thread count of less than 125 cords/dm.

Preferably, said textile reinforcing cords of the first plurality of textile reinforcing cords and of the second plurality of textile reinforcing cords have thread count of less than 120 cords/dm.

Preferably, said textile reinforcing cords of the first plurality of textile reinforcing cords and of the second plurality of textile reinforcing cords have thread count of 112 cords/dm.

Preferably, said textile reinforcing cords of the first plurality of textile reinforcing cords and of the second plurality of textile reinforcing cords have equal torsion imparted respectively both to each end and to the whole of the ends forming said textile reinforcing cords.

Preferably, said textile reinforcing cords of the first plurality of textile reinforcing cords and of the second plurality of textile reinforcing cords have torsion imparted respectively to each end and to the whole of the ends forming said textile reinforcing cords greater than 30 twists per decimeter.

Preferably, said textile reinforcing cords of the first plurality of textile reinforcing cords and of the second plurality of textile reinforcing cords have torsion imparted respectively to each end and to the whole of the ends forming said textile reinforcing cords greater than 35 twists per decimeter.

Preferably, said textile reinforcing cords of the first plurality of textile reinforcing cords and of the second plurality of textile reinforcing cords have torsion imparted respectively to each end and to the whole of the ends forming said textile reinforcing cords greater than 38 twists per decimeter.

Preferably, said textile reinforcing cords of the first plurality of textile reinforcing cords and of the second plurality of textile reinforcing cords have torsion imparted respectively to each end and to the whole of the ends forming said textile reinforcing cords less than 65 twists per decimeter.

Preferably, said textile reinforcing cords of the first plurality of textile reinforcing cords and of the second plurality of textile reinforcing cords have torsion imparted respectively to each end and to the whole of the ends forming said textile reinforcing cords less than 55 twists per decimeter.

Preferably, said textile reinforcing cords of the first plurality of textile reinforcing cords and of the second plurality of textile reinforcing cords have torsion imparted respectively to each end and to the whole of the ends forming said textile reinforcing cords less than 45 twists per decimeter.

Preferably, said textile reinforcing cords of the first plurality of textile reinforcing cords and of the second plurality of textile reinforcing cords have torsion imparted respectively to each end and to the whole of the ends forming said textile reinforcing cords of 40 twists per decimeter.

Preferably, said predetermined angle of inclination of the textile reinforcing cords of the first plurality of textile reinforcing cords and of the second plurality of textile reinforcing cords is comprised between 65° and 90° at the crown portion of the tread band, more preferably comprised between 65° and 75°, for example 70°.

Preferably, said first carcass ply and said second carcass ply consist of a respective sheet of elastomeric material incorporating said first plurality of textile reinforcing cords and said second plurality of textile reinforcing cords, respectively.

Preferably, a belt structure is provided at a radially outer position with respect to the radial carcass structure and at a radially inner position with respect to the tread band.

Preferably, said belt structure comprises a belt layer comprising at least one reinforcing cord that forms a plurality of turns substantially oriented according to a circumferential direction of the tyre.

Preferably, said belt layer comprises a reinforced ribbon-like element of rubberized fabric comprising a plurality of reinforcing cords side by side in the axial direction forming a plurality of turns substantially oriented according to the circumferential direction of the tyre.

Preferably, said plurality of turns are inclined by an angle comprised between 0° and 5° with respect to the equatorial plane of the tyre.

Preferably, said at least one reinforcing cord is made of metal material.

Preferably, said at least one reinforcing cord is made of steel with high carbon content, wherein the carbon content is at least 0.6% by weight.

Preferably, there is a carcass reinforcement structure made of elastomeric material radially placed between the radial carcass structure and the belt structure.

Preferably, said carcass reinforcement structure made of elastomeric material extends axially over a surface substantially corresponding to a surface of extension of the belt structure.

DESCRIPTION OF EMBODIMENTS OF THE INVENTION

Further characteristics and advantages of the tyre of the present invention will become clearer from the following detailed description of preferred embodiments thereof, made with reference to the attached drawings. In such drawings.

Figure 1:
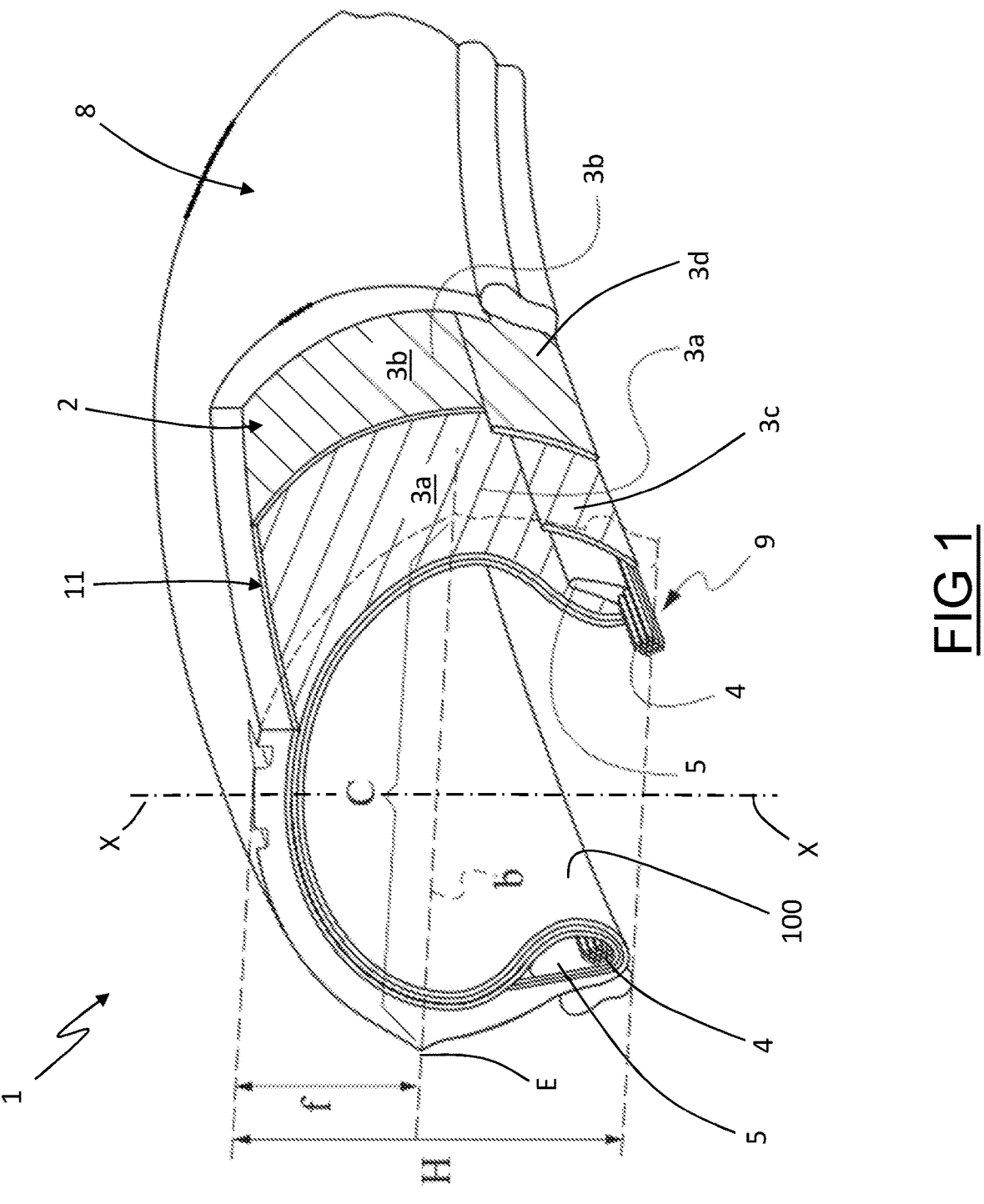
FIG. 1 is a schematic perspective view of a radial section of a motorcycle tyre in accordance with the present invention, where for the sake of simplicity of illustration grooves and blocks on the tread band have not been represented.
Figure 1A:
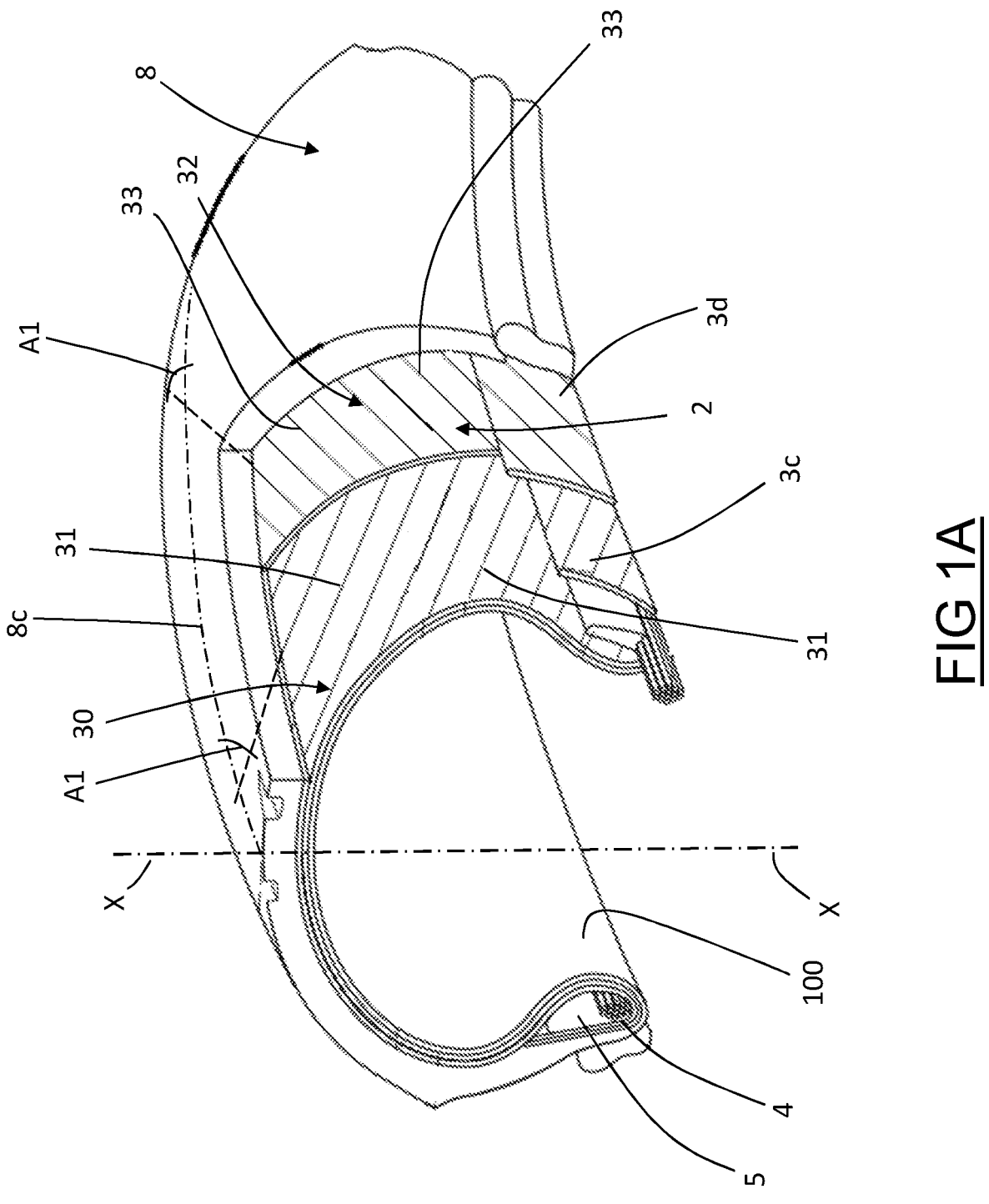
FIG. 1A is a further schematic perspective view of a radial section of a motorcycle tyre in accordance with the present invention, where for the sake of simplicity of illustration grooves and blocks on the tread band have not been represented.
Figure 2:
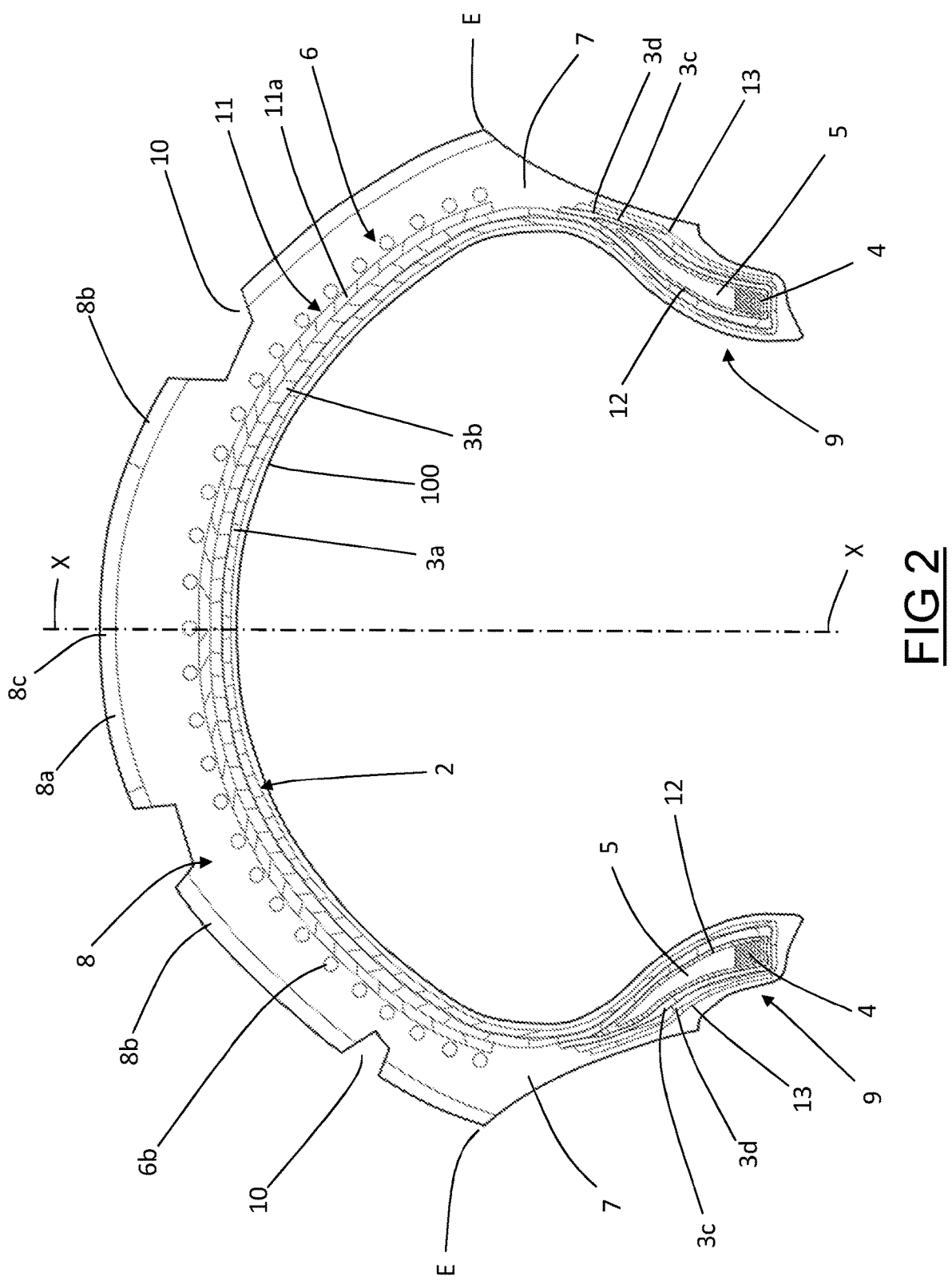
FIG. 2 is a schematic view of a radial section of a motorcycle tyre in accordance with the present invention.

With reference to FIGS. 1 and 2, reference numeral 1 indicates a motorcycle tyre in accordance with the present invention.

The tyre 1 represented is a rear tyre, but the following description applies identically to a front tyre, except when specific reference is made to rear tyres.

The tyre 1 is a motorcycle tyre defined as "big enduro" of large displacement (for example equal to 1000 cm$^3$) and high power (for example equal to 100 cv) and having motorcycle mass in riding configuration for example equal to 200 Kg or more.

The tyre 1 generally has maximum width of radial section comprised between 90 and 170 (for example between 90 and 120 in the case of a front tyre and between 130 and 170 in the case of a rear tyre) and is intended to be mounted on wheel rims having fitting diameters comprised between about 17 inches and about 21 inches (for example between 19 and 21 inches in the case of a front tyre and between 17 and 18 inches in the case of a rear tyre).

An equatorial plane "X-X" and a rotation axis (not illustrated) are defined in the tyre 1. A circumferential direction arranged according to the direction of rotation of the tyre 1 and therefore parallel to the equatorial plane X-X and an axial direction perpendicular to the equatorial plane "X-X" and/or parallel to the rotation axis are also defined.

The tyre 1 comprises a radial carcass structure 2 formed from a first carcass ply 3a and a second carcass ply 3b.

The first carcass ply 3a consists of a sheet of elastomeric material incorporating a first plurality of textile reinforcing cords 30.

The second carcass ply 3b consists of a sheet of elastomeric material incorporating a second plurality of textile reinforcing cords 32.

The elastomeric material making the sheet of elastomeric material of the first carcass ply 3a is the same as the elastomeric material making the sheet of elastomeric material of the second carcass ply 3a.

In an embodiment, the first ply of carcass 3a is made by bringing together a plurality of strips of elastomeric material reinforced by the first plurality of textile reinforcing cords 30.

In an embodiment, the second ply of carcass 3b is made by bringing together a plurality of strips of elastomeric material reinforced by the second plurality of textile reinforcing cords 32.

The textile reinforcing cords 31 of the first plurality of textile reinforcing cords 30 are arranged substantially parallel to each other and oriented along a substantially axial direction. The textile reinforcing cords 31 of the first plurality of textile reinforcing cords 30 have a first inclination at the crown portion 8c of the tread band, of predetermined angle of inclination A1, with respect to the equatorial plane X-X of the tyre. Each textile reinforcing cord 31 of the first plurality of textile reinforcing cords 30 belongs to a respective radial plane of the tyre 1.

Similarly, the textile reinforcing cords 33 of the second plurality of textile reinforcing cords 32 are arranged substantially parallel to each other and oriented along a substantially axial direction. The textile reinforcing cords 33 of the second plurality of textile reinforcing cords 32 have a second inclination, of the same predetermined angle of inclination A1 as the textile reinforcing cords 31 of the first plurality of textile reinforcing cords 30, with respect to the equatorial plane X-X of the tyre.

Each textile reinforcing cord 33 of the second plurality of textile reinforcing cords 32 belongs to a respective radial plane of the tyre 1.

Such a predetermined angle of inclination A1 is comprised, in absolute value, between 65° and 90° with respect to the circumferential direction. The first inclination is opposite to the second inclination with respect to the circumferential direction. In other words, the predetermined angle of inclination A1 of the first inclination is measured, with respect to the circumferential direction, along a first angular direction, and the predetermined angle of inclination A1 of the second inclination is measured, with respect to the circumferential direction, along a second angular direction in which the first angular direction and the second angular direction are opposite.

In the preferred embodiment of the invention, the predetermined angle of inclination A1 is, in absolute value, about 70°.

As best represented in FIG. 1, the first carcass ply 3a and the second carcass ply 3b are radially juxtaposed and preferably adjacent in the radial direction. The second carcass ply 3b is radially outer with respect to the first carcass ply 3a.

The textile reinforcing cords 31, 33 of the first plurality of textile reinforcing cords 30 and of the second plurality of textile reinforcing cords 32 are identical to each other.

The radial carcass structure 2 is typically coated, on the inner walls thereof, by a sealing layer 100, or so-called "liner", essentially consisting of an airtight layer of elastomeric material, adapted for ensuring the hermetic seal of the tyre itself 1 once inflated.

The first carcass ply 3a and the second carcass ply 3b are conformed according to a substantially toroidal configuration and have their respective axially opposite side edges 3c, 3d turned up at respective annular reinforcing structures 4, as best illustrated in FIG. 1. The annular reinforcing structures 4 are intended to hold the tyre 1 on a corresponding mounting rim (not illustrated). The annular reinforcing structures 4 are typically called "bead cores".

The outer perimeter edge of the bead cores 4 has a tapered elastomeric filler 5 applied on it, which occupies the space defined between the first carcass ply 3 and the turned side edge 3c of the first carcass ply 3a.

In an alternative embodiment, not illustrated, the first carcass ply 3a and the second carcass ply 3b may have the opposite side edges 3c, 3d associated without turning with particular annular reinforcing structures provided with two metallic annular inserts.

The area of the tyre 1 comprising the bead core 4 and the elastomeric filler 5 forms the so-called bead 9, which is intended for anchoring the tyre 1 on the rim, not illustrated.

The tyre 1 comprises a pair of sidewalls 7 applied laterally on opposite sides to the radial carcass structure 2.

In a possible preferred embodiment, the stiffness of sidewall 7 of the tyre 1 can be improved by providing the bead 9 with a reinforcing layer 12 (illustrated in FIG. 2 and not illustrated in FIG. 1) generally known as "flipper" or additional strip-shaped insert.

The flipper 12 is a reinforcing layer that is wound around the respective bead wire 4 and the elastomeric filler 5 so as to at least partially wrap around them. Such a reinforcing layer is arranged between the radial carcass structure 2 and the bead 9.

Preferably, the flipper 12 is in contact with the first carcass ply 3a and the bead 9.

In a possible preferred embodiment, the bead 9 can comprise a further protective layer 13 (illustrated in FIG. 2 and not represented in FIG. 1), generally known as a "chafer" or protective strip, which has the function of increasing stiffness and integrity of the bead 9.

In the preferred embodiment, a carcass reinforcement structure 11 is provided at a radially outer position with respect to the radial carcass structure 2. Such a carcass reinforcement structure 11 comprises a crown ply 11a arranged in radially outer position with respect to the second carcass ply 3b and at at least one crown portion of the second carcass ply 3b.

The crown ply 11a comprises reinforcing elements arranged parallel to each other. The crown ply 11a is arranged on the second carcass ply 3b so that the reinforcing elements of the crown ply 11a have, with reference to the equatorial plane, opposite angle to those of the second carcass ply 3b. Optionally, the carcass reinforcement structure 11 also comprises two plies (not illustrated) arranged on opposite sides with respect to the crown ply 11a and not associated with the respective beads.

A belt structure 6 (illustrated in FIG. 2) is circumferentially applied to the radial carcass structure 2, in radially outer position.

The belt structure 6 comprises a belt layer 6a comprising at least one reinforcing cord 6b forming a plurality of turns.

Preferably, the belt structure 6 is of the zero degrees type, i.e. the belt layer 6a is made through reinforcing cords 6b arranged substantially parallel and side-by-side to form a plurality of turns. Such turns are substantially oriented according to the circumferential direction (typically with an angle between 0° and 5°), such a direction usually being called "zero degrees" with reference to how it lays with respect to the circumferential direction of the tyre 1.

Preferably, the belt layer 6a comprises axially side-by-side windings of a ribbon-like reinforced element of rubberized fabric comprising a plurality of reinforcing cords 6b side-by-side in the axial direction to form the plurality of turns substantially oriented according to the circumferential direction of the tyre 1.

In the case in which a ribbon-like reinforced element is used, it may comprise up to seven reinforcing cords 6b, more preferably three reinforcing cords 6b.

Preferably, the winding defined by the turns extends axially over the entire crown portion of the radial carcass structure 2, with a winding pitch that is preferably constant in the axial direction.

The reinforcing cords 6b of the belt layer 6a are metallic, made from steel wires with high carbon content, i.e. steel wires with a carbon content of at least 0.6 to 0.7% by weight. Preferably, such metallic cords have high elongation (HE).

The belt structure 6 has a tread band 8 circumferentially juxtaposed over it, said tread band 8, after a molding operation carried out at the same time as a vulcanization step of the tyre 1, typically having circumferential and transversal grooves 10 formed on it, arranged to delimit a plurality of blocks.

With reference to FIG. 1, the tyre 1 has a section height "H" measured, on the equatorial plane "X-X", between the top of the tread band 8 and the fitting diameter, identified by a reference line "r" passing through the beads 9 of the tyre 1.

The tyre 1 also has a maximum width of radial section "C", defined by the distance between the laterally opposite ends "E" of the tread band 8, and an arrow "f", defined by the distance of the top of the tread band 8 from a line passing through said laterally opposite ends "E", measured on the equatorial plane "X-X" of the tyre 1. The laterally opposite ends "E" of the tread band 8 can be formed with an edge.

The tyre 1 has a "curvature ratio" (f/C) defined by the ratio between the arrow "f" and the aforementioned maximum width of radial section "C".

The tyre 1 has a ratio of "arrow over total height" (f/H) given by the ratio between the arrow "f" and the section height "H".

The quoted reference markings ("H", "X-X", "r", "C", "f", "E") are identical both for the front tyre and for the rear tyre.

Preferably, the arrow "f" of the tyre 1 is comprised between about 40 mm and about 60 mm.

The tyre 1 has a curvature ratio "f/C" comprised between about 0.25 and about 0.35, for example equal to about 0.26.

The tyre 1 has an arrow over total height ratio "f/H" comprised between about 0.40 and about 0.60, for example equal to about 0.43.

In the case of front tyres, the arrow "f" is comprised between about 35 mm and about 60 mm and the curvature ratio "f/C" is comprised between about 0.30 and about 0.40, for example equal to 0.38.

Again in the case of front tyres, the arrow over total height ratio "f/H" is comprised between about 0.40 and about 0.60, for example equal to about 0.53.

In the preferred embodiment of the present invention, the textile reinforcing cords 31, 33 of the first plurality of textile reinforcing cords 30 and of the second plurality of textile reinforcing cords 32 incorporated in the first carcass ply 3a and in the second carcass ply 3b, respectively, have a tenacity greater than 0.52 cN/Tex at 2% elongation.

In the preferred embodiment of the present invention, the textile reinforcing cords 31, 33 of the first plurality of textile reinforcing cords 30 and of the second plurality of textile reinforcing cords 32 incorporated in the first carcass ply 3a and in the second carcass ply 3b, respectively, have a tenacity of less than 0.65 cN/Tex at 2% elongation.

For example, the tenacity of the textile reinforcing cords 31, 33 of the first plurality of textile reinforcing cords 30 and of the second plurality of textile reinforcing cords 32 is 0.57 cN/Tex at 2% elongation.

In the preferred embodiment of the present invention, the textile reinforcing cords 31, 33 of the first plurality of textile reinforcing cords 30 and of the second plurality of textile reinforcing cords 32 have a tenacity greater than 0.87 cN/Tex at 5% elongation.

In the preferred embodiment of the present invention, the textile reinforcing cords 31, 33 of the first plurality of textile reinforcing cords 30 and of the second plurality of textile reinforcing cords 32 have a tenacity less than 1.2 cN/Tex at 5% elongation.

For example, the tenacity of the textile reinforcing cords 31, 33 of the first plurality of textile reinforcing cords 30 and of the second plurality of textile reinforcing cords 32 is 1 cN/Tex at 5% elongation.

A preferred material for making the textile reinforcing cords 31, 33 of the first plurality of textile reinforcing cords 30 and of the second plurality of textile reinforcing cords 32 is Nylon 6.6.

In the preferred embodiment of the present invention, the textile reinforcing cords 31, 33 of the first plurality of textile reinforcing cords 30 and of the second plurality of textile reinforcing cords 32 have linear density greater than 2600 dTex.

In the preferred embodiment of the present invention, the textile reinforcing cords 31, 33 of the first plurality of textile reinforcing cords 30 and of the second plurality of textile reinforcing cords 32 have linear density less than 3000 dTex.

For example, the textile reinforcing cords 31, 33 of the first plurality of textile reinforcing cords 30 and of the second plurality of textile reinforcing cords 32 have linear density of 2800 dTex.

In the preferred embodiment of the present invention, the textile reinforcing cords 31, 33 of the first plurality of textile reinforcing cords 30 and of the second plurality of textile reinforcing cords 32 have linear density greater than 1300×2 dTex where the term x2 represents the number of ends of yarn twisted together in each reinforcing cord.

In the preferred embodiment of the present invention, the textile reinforcing cords 31, 33 of the first plurality of textile reinforcing cords 30 and of the second plurality of textile reinforcing cords 32 have linear density of less than 1500×2 dTex where the term x2 represents the number of ends of yarn twisted together in each reinforcing cord.

For example, the textile reinforcing cords 31, 33 of the first plurality of textile reinforcing cords 30 and of the second plurality of textile reinforcing cords 32 have linear density of 1400×2 dTex, where the term x2 represents the number of ends of yarn twisted together in each reinforcing cord.

In the preferred embodiment of the present invention, the textile reinforcing cords 31, 33 of the first plurality of textile reinforcing cords 30 and of the second plurality of textile reinforcing cords 32 have thread count greater than 105 cords/dm.

In the preferred embodiment of the present invention, the textile reinforcing cords 31, 33 of the first plurality of textile reinforcing cords 30 and of the second plurality of textile reinforcing cords 32 have thread count of less than 120 cords/dm.

For example, the textile reinforcing cords 31, 33 of the first plurality of textile reinforcing cords 30 and of the second plurality of textile reinforcing cords 32 have thread count of 112 cords/dm.

In the preferred embodiment of the present invention, the textile reinforcing cords 31, 33 of the first plurality of textile reinforcing cords 30 and of the second plurality of textile reinforcing cords 32 have torsion imparted to each end and to the whole of the ends that form said textile reinforcing cords greater than 38 and 42 twists per decimeter, respectively.

In the preferred embodiment of the present invention, the textile reinforcing cords 31, 33 of the first plurality of textile reinforcing cords 30 and of the second plurality of textile reinforcing cords 32 have torsion imparted to each end and to the whole of the ends that form said textile reinforcing cords of less than 42 twists per decimeter, respectively.

For example, the textile reinforcing cords 31, 33 of the first plurality of textile reinforcing cords 30 and of the second plurality of textile reinforcing cords 32 have torsion imparted respectively to each end and to the whole of the ends forming said textile reinforcing cords of 40 twists per decimeter.

The tread band 8 comprises at least one central annular sector 8a (schematized in FIG. 2) arranged astride of the equatorial plane X-X made of elastomeric material.

In accordance with a preferred embodiment of the invention, the tread band 8 can be of the so-called "cap-and-base" type or be made of two different elastomeric materials.

In the preferred embodiment of the invention, the tread band 8 has, in addition to the central annular sector 8a, two lateral annular sectors 8b arranged symmetrically on opposite sides with respect to the equatorial plane X-X of the tyre and arranged adjacent to the central annular sector.

The two lateral annular sectors 8b are made of a different elastomeric material from the elastomeric material with which the central annular sector 8a is made.

The central annular sector 8a has an axial extension of width greater than 18% of the width of the tread band 8.

The central annular sector 8a has an axial extension of width less than 26% of the width of the tread band 8.

In the preferred embodiment of the invention, the central annular sector 8a has an axial extension of width greater than 20 percent of the width of the tread band 8.

In the preferred embodiment of the invention, the central annular sector 8a has an axial extension of width less than 24%.

For example, the central annular sector 8a has an axial extension of width equal to 22% of the width of the tread band 8.

The two lateral annular sectors 8b are arranged at respective distances along the axial extension and with respect to the equatorial plane X-X greater than 9% of the axial extension of tread band 8, preferably greater than 11% of the axial extension of tread band 8.

The axial extensions of the two lateral annular sectors have equal width.

The sum of the widths of the axial extensions of the two lateral annular sectors 8b and the axial extension of the central annular sector 8a coincides with the width of the axial extension of the tread band 8.

Typically, for the tyre compounds according to the invention, the ingredients listed below and others typically used in the tyre industry can be used.

In particular, for the tread compounds of the lateral annular sectors 8b and of the central annular sector 8a it is possible to use elastomeric compositions comprising at least one diene elastomeric polymer, selected, for example, from diene elastomeric polymers commonly used in sulfur-cross-linkable elastomeric compositions (vulcanization), peroxides or other systems known to those skilled in the art and which are particularly suitable for tyre production, or from elastomeric polymers or copolymers with an unsaturated chain having a glass transition temperature (Tg) normally below 20° C., preferably in the range of 0° C. to −110° C.

Preferably, the tread compound of the lateral annular sectors 8b and of the central annular sector 8a comprises 100 phr of at least one diene elastomeric polymer comprising an amount comprised between 50 and 90 phr of at least one styrene-butadiene rubber (dry polymer) selected from: solution styrene-butadiene rubber (S-SBR), emulsion styrene-butadiene rubber (E-SBR), or mixtures thereof.

Commercial examples of SBR polymers useful in the present invention are Tufdene polymers E581 and E680 from Ashai-Kasei (Japan), SPRINTAN SLR4602, SLR3402 and SLR4630 from Trinseo (Germany), HPR621 from JSR Corporation (Japan), BUNA SL-4518, BUNA SE 1502 and BUNA CB 22 from Arlanxeo (Germany), Europrene 5543T, Europrene 1739 and Intol 1789 from Versalis (Italy), HP 755 from Japan Synthetic Rubber Co. (Japan), and NIPOL NS 522 of Zeon Co. (Japan).

Preferably, the tread compound of the lateral annular sectors 8b and of the central annular sector 8a comprises 10 to 50 phr of at least one butadiene polymer (BR), preferably BR functionalized at low cis.

Preferably, the tread compound of the lateral annular sectors 8b and of the central annular sector 8a comprises 1 to 20 phr of one or more liquid polymers chosen from alkylene-based liquid polymers and copolymers, preferably butadiene-based (BR), isoprene (IR), isoprene/butadiene (IBR), styrene/butadiene (SBR), possibly functionalized hydroxy and epoxy, or from natural depolymerized liquid polymers (NR).

Preferably, the one or more liquid polymers are chosen from butadiene-based liquid polymers (BR).

Preferably, the tread compound of the lateral annular sectors 8b and of the central annular sector 8a comprises at least one resin.

Preferably, the resin is a polyherpene resin chosen from homo- or copolymers of alpha-pinene, beta-pinene, limonene, and vinyl aromatic monomers (styrene) and/or aromatic monomers (phenol).

Examples of commercial terpene-based natural resins are: Piccolyte F90 and Piccolyte F105 Resin 2495, manufactured by PINOVA; Dercolyte A 115 and Dercolyte M 115, manufactured by DRT.

The at least one resin can be a hydrocarbon.

Preferably, the hydrocarbon resin is chosen from resins derived from coumarone-indene, styrene-indene, styrene-alkylstyrene, and aliphatic resins.

Specific examples of commercially available hydrocarbon resins are NOVARES C resins, produced by RUTGERS CHEMICAL GmbH (synthetic indene-coumarone resins), NOVARES C10, C30 and C90 being particularly preferred.

Examples of commercially available styrene-indene hydrocarbon resins are UNILENE A 100, produced by Braskem, and Novares TT 90, produced by Ruetgers.

Preferably, the at least one resin is present in amounts of 5 to 50 phr, more preferably 10 to 40 phr.

Preferably, the tread compound of the lateral annular sectors 8b and of the central annular sector 8a according to the present invention comprises at least one plasticizing oil.

The term "plasticizing oil" is meant to indicate a process oil derived from petroleum or a mineral oil or an oil of vegetable origin or an oil of synthetic origin or combinations thereof.

The plasticizing oil can be a petroleum-derived process oil chosen from paraffins (saturated hydrocarbons), naphthenes, aromatic polycyclics, and mixtures thereof.

Examples of suitable petroleum-derived process oils are aromatic, paraffinic, naphthenic oils such as MES (Mild Extract Solvated), DAE (Distillate Aromatic Extract), TDAE (Treated Distillate Aromatic Extract), TRAE (Treated Residual Aromatic Extract), and RAE (Residual Aromatic Extract) known in the industry.

Plasticizing oil can be an oil of natural or synthetic origin derived from the esterification of glycerol with fatty acids, comprising triglycerides, diglycerides, monoglycerides of glycerin or mixtures thereof.

Examples of suitable vegetable oils are sunflower oil, soybean oil, linseed oil, rapeseed oil, castor oil, and cotton oil.

An example of an oil used in compounds is Tri-(2-ethylhexyl)-phosphate (TOF), Lanxess The plasticizing oil can be a synthetic oil chosen from alkyl or aryl esters of phthalic acid or phosphoric acid.

Preferably, oils of natural (e.g. vegetable) or synthetic origin have a glass transition temperature (Tg) below −70° C. (according to ISO 28343:2010).

Examples of suitable commercial plasticizing oils are petroleum-derived oils: NYTEX 4700 marketed by Nynas, EXTENSOIL 1471 marketed by Repsol, VIVATEC 500 marketed by H&R; and vegetable oils: RADIA 6132 marketed by Oleon, Agripure AP 18 and Agripure AP 75 marketed by Cargill.

Preferably, the total amount of oil, which includes both the added oil and any oil already present as a diluent of the elastomeric polymers, is 10 to 70 phr, more preferably 20 to 60 phr.

The elastomeric composition for tyres according to the present invention can comprise at least 20 phr, preferably at least 30 phr, more preferably at least 40 phr, even more preferably at least 50 phr of at least one reinforcing filler.

The present composition can comprise from 10 phr to 150 phr, 30 phr to 120 phr of at least one reinforcing filler.

Preferably, the reinforcing filler is chosen from carbon black, white fillers, silicate fibers and mixtures thereof.

In an embodiment, said reinforcing filler is a white filler chosen from hydroxides, oxides and hydrated oxides, salts and hydrated salts of metals, silicate fibers or mixtures thereof. Preferably, said white filler is silica.

Preferably, said silica is present in the elastomeric composition in an amount between 10 phr and 130 phr, more preferably between 40 phr and 110 phr, even more preferably between 70 and 100 phr.

Commercial examples of suitable conventional silica are Zeosil 1165 MP from Solvay, and Ultrasil 7000 GR from Evonik.

In an embodiment, said reinforcing filler is carbon black.

Preferably, said carbon black is present in the elastomeric composition in an amount comprised between 1 phr and 100 phr, more preferably between 5 phr and 70 phr.

Preferably, carbon black is chosen from those having a surface area of not less than 20 m2/g, preferably more than 50 m2/g (determined by STSA—statistical thickness surface area according to ISO 18852:2005).

The carbon black can be, for example, N234, N326, N330, N375 or N550, N660 marketed by Birla Group (India) or CRX 1391 from Cabot Corporation.

Preferably, the reinforcing filler comprises carbon black and silica, in particular preferably 2 to 15 phr of carbon black and 40 to 110 phr of silica, more preferably 5 to 10 phr of carbon black and 70 to 100 phr of silica.

The elastomeric composition for tyre compounds preferably comprises at least 0.7 phr, more preferably at least 1 phr of at least one vulcanizing agent.

The elastomeric composition for tyre compounds preferably comprises 0.5 to 7 phr, more preferably 1 to 5 phr of a vulcanizing agent.

The at least one vulcanizing agent is preferably chosen from sulfur, or alternatively, sulfur-containing molecules (sulfur donors), such as bis[(trialkoxysilyl)propyl]polysulfides, and mixtures thereof.

Preferably, the vulcanizing agent is sulfur, preferably chosen from soluble sulfur (crystalline sulfur), insoluble sulfur (polymeric sulfur) and oil-dispersed sulfur and mixtures thereof.

Commercial examples of vulcanizing agent suitable for use in the elastomeric composition of the invention are Rhenocure(R) IS90P from RheinChemie or Redball Superfine sulfur from International Sulphur Inc.

In the present elastomeric compounds, the vulcanizing agent can be used together with adjuvants such as activators, accelerants and/or retardants of vulcanization known to those skilled in the art.

The elastomeric compounds may possibly comprise at least one vulcanization-activating agent.

The vulcanization activating agents suitable for use in the present elastomeric compounds are zinc compounds, particularly ZnO, ZnCO3, zinc salts of saturated or unsaturated fatty acids containing 8 to 18 carbon atoms, which are preferably formed in situ in the elastomeric compound by reaction of ZnO and fatty acid or mixtures thereof. For example, zinc stearate, preferably formed in situ in the elastomeric compound from ZnO and fatty acid, or magnesium stearate, formed from MgO, or mixtures thereof, is used.

The vulcanization activating agents may be present in the elastomeric compound of the invention in amounts preferably from 0.2 phr to 15 phr, more preferably from 1 phr to 5 phr.

Preferred activating agents are derived from the reaction of zinc oxide and stearic acid.

Examples of activator are Aktiplast ST Rheinchemie and Zinc bis-neodecanoate VALIKAT Zn 1910 Umicore.

The elastomeric compound may further comprise at least one vulcanization accelerant.

Primary and secondary vulcanization accelerants that are commonly used can be chosen from, for example, dithiocarbamates, guanidines, thioureas, thiazoles, sulfenamides, sulfenimides, thiurams, amines, xanthates, or mixtures thereof.

Preferably, the accelerant agent is chosen from mercaptobenzothiazole (MBT), N-cyclohexyl-2-benzothiazolsulfenamide (CBS), N-tert-butyl-2-benothiazol-sulfenamide (TBBS) dibenzothiazole disulfide (MBTS) and mixtures thereof.

Commercial examples of accelerant agents suitable for use in the present elastomeric compound are Vulkacit@N-cyclohexyl-2-benzothiazyl sulfenamide (CBS or CZ) and N-terbutyl 2-benzothiazyl sulfenamide, Vulkacit @NZ/EGC marketed by Lanxess, Tetrabenzylthiurame disulfide (Perkacit@TBzTD), Dibenzothiazole disulfide Rhenogran MBTS 80, N-tert-butyl-2-benzothiazylsulfenamide from Huatai Chemicals TBBS.

The vulcanization accelerants can be used in the present elastomeric compound in an amount preferably from 0.05 phr to 10 phr, preferably from 0.1 phr to 7 phr, more preferably from 0.5 phr to 5 phr.

The elastomeric compound may possibly comprise at least one vulcanization retardant agent.

The vulcanization retardant agent suitable for use in the elastomeric compound is preferably chosen from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G from Lanxess.

The vulcanization retardant agent may be present in the elastomeric compound in an amount preferably from 0.05 phr to 2 phr.

This elastomeric compound may comprise one or more vulcanization retardant agents as defined above in mixture.

The elastomeric compound may further comprise at least 0.05 phr, preferably at least 0.1 phr or 0.5 phr, more preferably at least 1 phr or 2 phr of at least one silane coupling agent.

Preferably the elastomeric compound comprises 0.5 phr to 10.0 phr, more preferably 1.0 phr to 8.0 phr, even more preferably 5 to 8 phr of at least one silane coupling agent.

Preferably, said coupling agent is a silane coupling agent chosen from those having at least one hydrolyzable silane group, which can be identified, for example, by the following general formula (III):

$$(R')3Si—CnH2n-X \qquad (III)$$

wherein the R' groups, which may be identical or different, are selected from: alkyl, alkoxy, or aryloxy groups or among halogen atoms, provided at least one of the R' groups is an alkoxy or aryloxy group; n is an integer from 1 to 6; X is a group selected from: nitroso, mercapto, amino, epoxide, vinyl, imide, chlorine, —(S)mCnH2n-Si-(R')3 and —S—COR', where m and n are integers from 1 to 6 and R' groups are defined as above.

Particularly preferred silane coupling agents are bis(3-triethoxysilyl-propyl) tetrasulfide and bis(3-triethoxysilyl-propyl) disulfide. Said coupling agents can be added as such or in a mixture with an inert filler (e.g. carbon black) so as to facilitate their incorporation into the elastomeric compound.

An example of a silane coupling agent is TESPT: bis(3-triethoxysilylpropyl) tetrasulfide Si69 marketed by Evonik.

The elastomeric compound may further comprise one or more additional ingredients, commonly used in the industry, such as antioxidant and/or antiozonating agents (anti-aging agents), waxes, adhesives, and the like.

The elastomeric compound may possibly comprise at least one wax.

For example, the wax can be a petroleum wax or a mixture of paraffins.

Commercial examples of suitable waxes are the mixture of N-paraffin from Repsol and Antilux@654 microcrystalline wax from Rhein Chemie.

The wax may be present in the elastomeric compound in an overall amount generally from 0.1 phr to 20 phr, preferably from 0.5 phr to 10 phr, more preferably from 1 phr to 5 phr.

The elastomeric compound may possibly comprise at least one antioxidant agent.

The antioxidant agent is preferably chosen from N-isopropyl-N'-phenyl-p-phenylenediamine (IPPD), N-(1,3-dimethyl-butyl)-N'-phenyl-p-phenylenediamine (6PPD), N,N'-bis-(1,4-dimethyl-pentyl)-p-phenylenediamine (77PD), N,N'-bis-(1-ethyl-3-methylpentyl)-p-phenylenediamine (DOPD), N,N'-Bis-(1,4-dimethylpentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-Bis(1-methylheptyl)-p-phenylenediamine, N,N'-Di-sec-butyl-p-phenylenediamine (44PD), N-phenyl-N'-cyclohexyl-p-phenylenediamine, N-phenyl-N'-1-methylheptyl-p-phenylenediamine and similar, and mixtures thereof, preferably it is N-1,3-dimethylbutyl-N-phenyl-p-phenylenediamine (6-PPD).

A commercial example of a suitable antioxidant agent is 6PPD from Solutia/Eastman.

The antioxidant agent may be present in the elastomeric composition in an overall amount preferably from 0.1 phr to 20 phr, preferably from 0.5 phr to 10 phr.

All elastomeric compositions used for the tyre according to the invention may comprise the aforementioned ingredients and other commonly selected additives based on the specific application for which each composition is intended.

In the preferred embodiment of the invention, the elastomeric material of the central annular sector 8a of tread band 8 is chosen so that the finished (vulcanized) tyre, at the central annular sector 8a, has a static elastic modulus Ca3 measured at 70° C. comprised between 9.0 and 14.0, a tandelta measured at 70° C. and 10 Hz comprised between 0.120 and 0.160, and a dynamic elastic modulus E' measured at 70° C. and 10 Hz comprised between 3.7 and 4.1.

Preferably, the elastomeric material of the central annular sector 8a of the tread band 8 is chosen so that the finished (vulcanized) tyre, at the central annular sector 8a, has a static elastic modulus Ca3 measured at 70° C. greater than 10.8.

Preferably, the elastomeric material of the central annular sector 8a of the tread band 8 is chosen so that the finished (vulcanized) tyre, at the central annular sector 8a, has a static elastic modulus Ca3 measured at 70° C. less than 11.9.

For example, the elastomeric material of the central annular sector 8a of the tread band 8 is chosen so that the finished (vulcanized) tyre, at the central annular sector 8a, has a static elastic modulus Ca3 measured at 70° C. of 11.5.

Preferably, the elastomeric material of the central annular sector 8a of the tread band 8 is chosen so that the finished (vulcanized) tyre, at the central annular sector 8a, has a tandelta measured at 70° C. and 10 Hz greater than 0.138.

Preferably, the elastomeric material of the central annular sector 8a of the tread band 8 is chosen so that the finished (vulcanized) tyre, at the central annular sector 8a, has a tandelta measured at 70° C. and 10 Hz less than 0.152.

For example, the elastomeric material of the central annular sector 8a of the tread band 8 is chosen so that the finished (vulcanized) tyre, at the central annular sector 8a, has a tandelta measured at 70° C. and 10 Hz of 0.145.

In the preferred embodiment of the invention, the elastomeric material of the central annular sector 8a of the tread band 8 is chosen so that the finished (vulcanized) tyre, at the central annular sector 8a, has an elastic dynamic modulus E' measured at 70° C. and 10 Hz greater than 3.8.

In the preferred embodiment of the invention, the elastomeric material of the central annular sector 8a of the tread band 8 is chosen so that the finished (vulcanized) tyre, at the central annular sector 8a, has an elastic dynamic modulus E' measured at 70° C. and 10 Hz less than 4.0.

For example, the elastomeric material of the central annular sector 8a of the tread band 8 is chosen so that the finished (vulcanized) tyre, at the central annular sector 8a, has a dynamic elastic modulus E' measured at 70° C. and 10 Hz of 3.9.

In the preferred embodiment of the invention, the ratio between tandelta measured at 70° C. and 10 Hz and dynamic elastic modulus E' measured at 70° C. and 10 Hz of the elastomeric material of the central annular sector 8a of the tread band 8 is greater than 0.034.

In the preferred embodiment of the invention, the ratio between tandelta measured at 70° C. and 10 Hz and dynamic elastic modulus E' measured at 70° C. and 10 Hz of the elastomeric material of the central annular sector 8a of the tread band 8 is less than 0.039.

For example, the ratio between tandelta measured at 70° C. and 10 Hz and dynamic elastic modulus E' measured at 70° C. and 10 Hz of the elastomeric material of the central annular sector 8a of the tread band 8 is 0.037.

The elastomeric material of the central annular sector 8a of the tread band 8 is chosen so that the finished (vulcanized) tyre, at the central annular sector 8a, has a tandelta measured at 70° C. and 10 Hz less than the tandelta measured at 70° C. and 10 Hz of the vulcanized elastomeric material of the two lateral annular sectors 8b.

The elastomeric material of the central annular sector 8a of the tread band 8 is chosen so that the finished (vulcanized) tyre, at the central annular sector 8a, has an elastic dynamic modulus E' measured at 70° C. and 10 Hz greater than the elastic dynamic modulus E' measured at 70° C. and 10 Hz of the vulcanized elastomeric material of the two lateral annular sectors 8b.

The elastomeric material of the central annular sector 8a of the tread band 8 is chosen so that the finished (vulcanized) tyre, at the central annular sector 8a, has a static elastic modulus Ca3 measured at 70° C. greater than said static elastic modulus Ca3 measured at 70° C. of the vulcanized elastomeric material of the two lateral annular sectors 8b.

For example, the elastomeric material of the central annular sector 8a of the tread band 8 is chosen so that the finished (vulcanized) tyre, at the central annular sector 8a, has a tandelta measured at 70° C. and 10 Hz equal to 92% of the tandelta measured at 70° C. and 10 Hz of the vulcanized elastomeric material of the two lateral annular sectors 8b.

For example, the elastomeric material of the central annular sector 8a of the tread band 8 is chosen so that the finished (vulcanized) tyre, at the central annular sector 8a, has an elastic dynamic modulus E' measured at 70° C. and 10 Hz equal to 106% of the elastic dynamic modulus E' measured at 70° C. and 10 Hz of the vulcanized elastomeric material of the two lateral annular sectors 8b.

For example, the elastomeric material of the central annular sector 8a of the tread band 8 is chosen so that the finished (vulcanized) tyre, at the central annular sector 8a, has a static elastic modulus Ca3 measured at 70° C. equal to 130% of the static elastic modulus Ca3 measured at 70° C. of the vulcanized elastomeric material of the two lateral annular sectors 8b.

Comparative Tests

The Applicant has made a sample of a rear tyre 1 in accordance with an embodiment of the present invention. Such a tyre is indicated hereinafter with INV.

The tyre INV had identical dimensions to those of a rear tyre of the Applicant for motorcycles predominantly for road use and with limited off-road use and currently sold on the market. Such a tyre hereinafter is indicated with Ref.

The structure of the tyre INV and Ref were identical in terms of belt and bead structure, and both had a cap-and-base type tread band.

In particular, both tyres had a central annular sector and two lateral annular sectors of identical axial dimensions.

The two tyres had the characteristics shown in Table 1 in relation to the carcass structure.

TABLE 1

|  | INV | Ref |
| --- | --- | --- |
| No. of carcass plies | 2 | 1 |
| Linear density reinforcing cords in single carcass ply | 1400 | 1840 |
| No. of ends of reinforcing cord | 2 | 3 |
| No. single end twists | 40 | 38 |
| No. yarn twists with n ends | 40 | 38 |
| Thread count (cords/dm) | 112 | 97 |
| Tenacity at 2% elongation (cN/dtex) | 0.57 | 1.48 |
| Tenacity at 5% elongation (cN/dtex) | 1.0 | 3.67 |
| Reinforcing cord material | Nylon | Lyocell |

As can be seen from Table 1 above, the reinforcing cords used in the carcass plies of the tyre according to the invention have mechanical characteristics of lower stiffness with respect to those of the reinforcement cords of the comparison tyre.

The elastomeric composition used to make the vulcanized elastomeric material of the lateral annular portions of the two tyres was identical and is shown in Table 2 in the column indicated with "lateral portions."

The elastomeric composition used to make the vulcanized elastomeric material of the central annular sector of the two tyres is shown in Table 2.

TABLE 2

| Ingredient | INV<br>Elastomeric<br>composition<br>(phr) | Ref<br>Elastomeric<br>composition<br>(phr) | Lateral<br>portions<br>Elastomeric<br>composition<br>(phr) |
|---|---|---|---|
| S-SBR | 110 (80) | 96.2 (70) | 100.4 (73) |
| functionalized BR | 20 | — | — |
| BR | — | 30 | 27 |
| CB1 | 15 | — | 10 |
| CB2 | — | 25 | — |
| Silica1 | 85 | — | 90 |
| Silica2 | — | 75 | — |
| TDAE oil | — | — | 15 |
| Liquid Butadiene1 | 5 | — | — |
| Liquid Butadiene2 | — | 10 | — |
| TOF plasticizer | 15 | — | 4 |
| Terpene Resin | 20 | 15 | — |
| Styrene Indene Resin | — | 15 | 20 |
| Zinc salt 1 | 5 | 5 | — |
| Zinc Salt 2 | 2.5 | 2.5 | 2.5 |
| Zinc Salt 3 | — | — | 3 |
| Silane | 7.2 | 6 | 7.2 |
| Wax | 1 | — | 1 |
| 6PPD | 3 | 3 | 3 |
| Sulfur | 2.1 | 1.3 | 1.3 |
| TBBS | 2.5 | 2.2 | 2.2 |
| MBTS 80 | 1 | 0.8 | 0.75 |
| TBzTD | 0.3 | 0.3 | — |
| DPG 80 | — | — | 2 |
| PVI | — | — | 0.2 |

S-SBR: polymerized styrene-butadiene rubber in solution, extending with 37.5 parts TDAE oil for every 100 parts dry polymer (110 phr of extended polymer corresponds to 80 phr of dry polymer—96.2 phr of extended polymer corresponds to 70 phr of dry polymer—100.4 phr of extended polymer corresponds to 73 phr of dry polymer), Tufdene E680, Asahi Kasei.

functionalized BR: low cis functionalized polybutadiene YB03, Asahi Kasei BR: high cis polybutadiene from solution EUROPRENE NEOCIS BR 60, Versalis CB1: Carbon Black CRX 1391, Cabot CB2: Carbon Black N234, Cabot Silica1: ZEOSIL 1165 MP, Solvay Silica2: ULTRASIL 7000, Evonik TDAE oil Treated Distilate Aromatic Extract, Vivatec@500 (plasticizer), Hansen & Rosenthal, Germany Liquid butadiene1: RICON 100, Cray Valley Liquid butadiene2: POLYVEST 130, Evonik TOF plasticizer: Tri-(2-ethylhexyl)-phosphate (TOF), Lanxess Terpene Resin: Resin 2495, Pinova Styrene Indene Resin: Novares TT90; Reutgers Germany GmbH Zinc salt 1: Zinc bis-neodecanoate VALIKAT Zn 1910 Umicore Zinc salt 2: Zinc Stearate Aktiplast ST (Rheinchemie)

Zinc salt 3: 75% zinc octanoate, Purus

Silane: Si 69@-Bis[3-(triethoxysilyl)propyl]polysulfide, Evonik

Wax: N-paraffin and Iso-paraffin mixture BMO1, Repsol

6PPD: N-(1,3-dimethylbutyl)-N'-phenyl-p-phenylenediamine, Solutia Eastman;

Sulfur: Rhenocure@IS 90 P (RheinChemie)

TBBS: N-tert-butyl-2-benzothiazilsulfenamide from Huatai Chemicals

MBTS 80: Rhenogran MBTS 80 dibenzothiazole disulfide, Rhein Chemie

TBzTD: tetrabenzylthiurame disulfide (Perkacit@TBZTD).

DPG 80: N,N'-diphenylguanidine accelerant Rhenogran@RheinChemie

PVI N-cyclohexylthiophthalimide, manufactured by Brenntag Spa, Milan, Italy.

The following Table 3 shows the results of static and dynamic mechanical analyses performed on samples of vulcanized elastomeric materials obtained by vulcanizing the elastomeric compositions indicated in Table 2 above and used in the central annular sectors of the tyre according to the invention and of the comparison tyre.

The elastomeric materials were obtained by vulcanizing the elastomeric compositions indicated in Table 2 above at 170° C. for 15 minutes.

TABLE 3

| | INV | Ref | Lateral<br>portions |
|---|---|---|---|
| Static properties | | | |
| Ca3 (MPa) at 70° C. | 11.5 | 8.6 | 8.8 |
| Dynamic properties | | | |
| E' at 70° C. and 10 Hz (MPa). | 3.9 | 3.8 | 3.7 |
| Tandelta at 70° C. and 10 Hz | 0.145 | 0.183 | 0.157 |
| Tandelta/E' | 0.037 | 0.048 | 0.043 |

As can be seen from Table 3 above, the elastomeric material used in the central annular sector of the tyre according to the invention has a static stiffness under deformation 300% higher than the corresponding static stiffness of the elastomeric material used in the central annular sector of the comparison tyre: according to the Applicant, this characteristic may be predictive of greater driving stability. The elastomeric material used in the central annular sector of the tyre according to the invention has a slightly higher dynamic elastic modulus at 70° C. than that of the comparison tyre and a significantly lower tandelta, as a result, the tandelta/E' ratio, which can be correlated to a parameter indicative of tyre grip, is lower with respect to that of the elastomeric material used in the central annular sector of the comparison tyre. Such a reduced value of the tandelta/E' ratio for the crown portion of the tread band of the tyre according to the invention should be predictive of worsening tyre grip performance. Surprisingly, the driving tests performed (as described below) instead yielded results contrary to what was predicted.

Comparative outdoor tests were carried out with the tyre Ref, valued by customers due to its excellent behavior on-road and more than acceptable behavior off-road.

The tests were carried out under identical environmental conditions, in particular with temperatures between 10° C. and 40° C. for the dry asphalt tests and temperatures between 10° C. and 20° C. for the wet asphalt tests, fitting both tyres (inflated to the same 2.9 bar inflation pressure) on the rear wheel of a BMW R1250 GS motorcycle, while the front wheels were fitted with identical tyres.

The behavior of the two tyres INV and Ref. was evaluated both on the road (dry and wet) and non-extreme off-road, asking the driver to judge. In particular, the items listed in table 4 below were evaluated, where the opinion expressed by the driver is also given.

The road tests were carried out by traveling on a journey of straights and bends, both with dry road and with wet road.

In Table 4, indicates the positive rating obtained through the Ref. tyre, "+" indicates an improvement over the Ref. tyre, and "++" indicates an even larger improvement over the Ref. tyre.

TABLE 4

|  | Ref. | INV |
|---|---|---|
| Stability | = | ++ |
| Dry handling | = | + |
| Wet handling | = | + |
| Comfort relative to contact with the dry road | = | + |
| Comfort relative to driving safety in the wet | = | + |
| Wet braking | = | + |

Table 4 shows that the INV tyre offered improved performance on road surfaces compared with that of the Ref tyre, particularly with reference to stability and handling in dry and wet conditions.

The test also showed that the INV tyre also performed better than the Ref tyre in relation to comfort relative to contact with the dry road surface, comfort relative to driving safety in the wet and to wet braking.

The Applicant has thus had confirmation that by using a cross-ply carcass structure and a tread band having the characteristics adopted in the tyre of the invention it has indeed been possible to achieve the sought-after improvement in stability at high speeds on road surfaces without compromising and indeed surprisingly improving dry and wet handling.

Of course, those skilled in the art can bring further modifications and variants to the tyre 1 described above in order to satisfy specific and contingent application requirements, these variants and modifications in any case being covered by the scope of protection as defined by the following claims.

The invention claimed is:

1. A motorcycle tyre comprising a radial carcass structure and a tread band applied in radially outer position with respect to the radial carcass structure,
wherein the radial carcass structure comprises a first carcass ply including a first plurality of textile reinforcing cords and a second carcass ply including a second plurality of textile reinforcing cords,
wherein the textile reinforcing cords of the first plurality of textile reinforcing cords are substantially parallel to one another and have a first inclination at a crown portion of the tread band of predetermined angle of inclination, with respect to an equatorial plane (X-X) of the tyre and
wherein the textile reinforcing cords of the second plurality of textile reinforcing cords are substantially parallel to one another and have a second inclination at the crown portion of the tread band of the predetermined angle of inclination, with respect to the equatorial plane (X-X) of the tyre, wherein the second inclination is opposite to the first inclination, wherein the second carcass ply is radially juxtaposed over the first carcass ply,
wherein the textile reinforcing cords of the first plurality of textile reinforcing cords and of the second plurality of textile reinforcing cords have a tenacity ranging from 0.35 cN/Tex to 1.2 cN/Tex at 2% elongation and ranging from 0.5 cN/Tex to 3 cN/Tex at 5% elongation, and
wherein at least one central annular sector of the tread band arranged astride of the equatorial plane (X-X) is made of a vulcanized elastomeric material having a static elastic modulus Ca3 measured at 70° C. ranging from 9.0 to 14.0, a tandelta measured at 70° C. and at 10 Hz ranging from 0.120 to 0.160, and a dynamic elastic modulus E' measured at 70° C. and at 10 Hz ranging from 3.7 to 4.1.

2. The tyre according to claim 1, wherein at least one central annular sector of the tread band arranged astride of the equatorial plane (X-X) is made of a vulcanized elastomeric material having a static elastic modulus Ca3 measured at 70° C. ranging from 10.0 to 13.0 and a tandelta measured at 70° C. and at 10 Hz ranging from 0.135 and 0.155.

3. The tyre according to claim 1, wherein the central annular sector has an axial extension of width greater than 15% of the width of the tread band and less than 30% of the width of the tread band.

4. The tyre according to claim 1, wherein the textile reinforcing cords of the first plurality of textile reinforcing cords and of the second plurality of textile reinforcing cords are made of aliphatic polyamide fibers.

5. The tyre according to claim 1, wherein the textile reinforcing cords of the first plurality of textile reinforcing cords and of the second plurality of textile reinforcing cords have thread count ranging from 80 cords/dm to 130 cords/dm.

6. The tyre according to claim 1, wherein the textile reinforcing cords of the first plurality of textile reinforcing cords and of the second plurality of textile reinforcing cords have torsion imparted respectively on each end and on the whole of the ends that form the textile reinforcing cords ranging from 30 twists per decimeter to 65 twists per decimeter.

7. The tyre according to claim 1, wherein the predetermined angle of inclination of the textile reinforcing cords of the first plurality of textile reinforcing cords and of the second plurality of textile reinforcing cords ranges from 65° to 90°.

8. The tyre according to claim 1, wherein the tread band has a void/solid ratio ranging from 0.4 to 0.65 and has a symmetrical tread pattern with respect to an equatorial plane (X-X) of the tyre.

9. The tyre according to claim 1, wherein the central annular sector of the tread band is made of a vulcanized elastomeric material having a ratio between tandelta measured at 70° C. and at 10 Hz and dynamic elastic modulus E' measured at 70° C. and at 10 Hz ranging from 0.03 to 0.04.

10. The tyre according to claim 9, wherein the central annular sector is made of a vulcanized elastomeric material having static elastic modulus Ca3 measured at 70° C. greater than a static elastic modulus Ca3 measured at 70° C. of the vulcanized elastomeric material of the two lateral annular sectors.

11. The tyre according to claim 1, wherein the tread band comprises two lateral annular sectors arranged on opposite sides with respect to the equatorial plane (X-X) of the tyre and arranged adjacent to the central annular sector; and wherein the central annular sector made of a vulcanized elastomeric material having tandelta measured at 70° C. and at 10 Hz less than a tandelta measured at 70° C. and at 10 Hz of the vulcanized elastomeric material of the two lateral annular sectors.

12. The tyre according to claim 11, wherein the central annular sector is made of a vulcanized elastomeric material having ratio between tandelta measured at 70° C. and at 10 Hz and dynamic elastic modulus E' measured at 70° C. and at 10 Hz greater than a ratio between tandelta measured at 70° C. and at 10 Hz and dynamic elastic modulus E' measured at 70° C. and at 10 Hz of the vulcanized elastomeric material of the two lateral annular sectors.

13. The tyre according to claim 1, wherein the textile reinforcing cords of the first plurality of textile reinforcing cords and of the second plurality of textile reinforcing cords have linear density ranging from 2000 dTex to 4600 dTex.

14. The tyre according to claim 13, wherein the textile reinforcing cords of the first plurality of textile reinforcing cords and of the second plurality of textile reinforcing cords have linear density ranging from 1100x2 dTex to 1840x2 dTex where the term x2 represents the number of ends of yarn twisted together in each reinforcing cord.

15. The tyre according to claim 1, further comprising a belt structure in radially outer position with respect to the radial carcass structure and radially inner position with respect to the tread band.

16. The tyre according to claim 15, wherein the belt structure comprises a belt layer comprising at least one reinforcing cord that forms a plurality of turns substantially oriented according to a circumferential direction of the tyre.

* * * * *